United States Patent
Chiba et al.

(10) Patent No.: US 9,616,952 B2
(45) Date of Patent: Apr. 11, 2017

(54) BOTTOM-PLATE STRUCTURE FOR VEHICLE SEAT

(71) Applicant: TS TECH CO., LTD., Asaka-shi, Saitama (JP)

(72) Inventors: Tomohisa Chiba, Shioya-gun (JP); Katsuhiro Kiya, Shioya-gun (JP); Yoshinori Ueyama, Shioya-gun (JP)

(73) Assignee: TS TECH CO., LTD., Asaka-shi (JP)

( * ) Notice: Subject to any disclaimer, the term of this patent is extended or adjusted under 35 U.S.C. 154(b) by 54 days.

(21) Appl. No.: 14/409,190

(22) PCT Filed: Jun. 27, 2013

(86) PCT No.: PCT/JP2013/067599
§ 371 (c)(1),
(2) Date: Dec. 18, 2014

(87) PCT Pub. No.: WO2014/003091
PCT Pub. Date: Jan. 3, 2014

(65) Prior Publication Data
US 2015/0175229 A1    Jun. 25, 2015

(30) Foreign Application Priority Data

Jun. 28, 2012  (JP) ................................. 2012-144884
May 27, 2013  (JP) ................................. 2013-110495

(51) Int. Cl.
*B60N 2/38*  (2006.01)
*B62J 1/08*  (2006.01)
(Continued)

(52) U.S. Cl.
CPC ................ *B62J 1/08* (2013.01); *B60N 2/015* (2013.01); *B60N 2/38* (2013.01); *B60N 2/40* (2013.01);
(Continued)

(58) Field of Classification Search
CPC . B60N 2/015; B60N 2/38; B60N 2/40; B60N 2/68; B60N 2/682; B60N 2/686; B61D 33/0014; B62J 1/08; B62J 1/12; B62J 1/18
(Continued)

(56) References Cited

U.S. PATENT DOCUMENTS 2,324,976 A    7/1943  Soper
4,026,600 A    5/1977  Kutaguchi
(Continued)

FOREIGN PATENT DOCUMENTS

JP    S07-13592 U    10/1932
JP    S31-17559 U    10/1956
(Continued)

OTHER PUBLICATIONS

Dec. 31, 2014 International Preliminary Report on Patentability issued in International Application No. PCT/JP2013/067599.
(Continued)

*Primary Examiner* — Jose V Chen
(74) *Attorney, Agent, or Firm* — Oliff PLC

(57) ABSTRACT

The purpose of the present disclosure is to provide a bottom-plate structure, for a vehicle seat, that can be reinforced with a reduced increase in weight. A bottom plate covered with a surface material is provided on a vehicle body, and the top surface of the bottom plate supports a cushioning material. The bottom plate has reinforcing parts that cross the width-wise center of the bottom plate, at least parts of the reinforcing parts being laid out obliquely with respect to the front-to-back direction of a vehicle seat. Since the reinforcing parts reinforce the bottom plate, the bottom plate can be reinforced with a reduced increase in bottom-plate weight relative to conventional bottom-plate structures.

18 Claims, 23 Drawing Sheets

(51) Int. Cl.
  *B62J 1/12* (2006.01)
  *B60N 2/40* (2006.01)
  *B60N 2/68* (2006.01)
  *B60N 2/015* (2006.01)
  *B62J 1/18* (2006.01)

(52) U.S. Cl.
  CPC ............... *B60N 2/686* (2013.01); *B62J 1/12* (2013.01); *B62J 1/18* (2013.01)

(58) Field of Classification Search
  USPC ......... 297/195.1, 214, 452.18, 202; 180/210, 180/908
  See application file for complete search history.

(56) References Cited

U.S. PATENT DOCUMENTS

| | | | |
|---|---|---|---|
| 4,451,083 A | 5/1984 | Marchello | |
| 4,691,963 A | 9/1987 | Mikuniya et al. | |
| 4,961,609 A | 10/1990 | Bigolin et al. | |
| 4,999,068 A | 3/1991 | Chiarella | |
| 5,108,076 A | 4/1992 | Chiarella | |
| 5,645,315 A | 7/1997 | Walker et al. | |
| 6,070,896 A | 6/2000 | Saiki | |
| 6,131,994 A | 10/2000 | Yates | |
| 6,231,122 B1 | 5/2001 | Goldstein | |
| 6,345,865 B1* | 2/2002 | Ashida | B62J 1/00 297/195.1 |
| 6,860,551 B1 | 3/2005 | Chi | |
| 7,159,936 B2 | 1/2007 | Bigolin et al. | |
| 7,448,664 B2* | 11/2008 | Karube | B62J 1/12 296/65.02 |
| 7,572,498 B2* | 8/2009 | Bigolin | B62J 1/26 297/195.1 |
| 7,690,730 B2* | 4/2010 | Yasuda | B60N 2/40 297/195.11 |
| 7,757,799 B2 | 7/2010 | Karube et al. | |
| 7,837,260 B2 | 11/2010 | Hein et al. | |
| 7,980,633 B2* | 7/2011 | Koyano | B62J 1/12 297/195.11 |
| 9,334,004 B2 | 5/2016 | Kawatani et al. | |
| 2006/0048987 A1 | 3/2006 | Karube et al. | |
| 2006/0061157 A1 | 3/2006 | Yokomizo | |
| 2007/0018488 A1* | 1/2007 | Hein | B62J 1/12 297/195.12 |
| 2011/0156453 A1 | 6/2011 | Matsushima | |
| 2012/0242122 A1* | 9/2012 | Kawatani | B62J 1/12 297/214 |
| 2013/0300178 A1* | 11/2013 | Murata | B60N 2/646 297/452.18 |
| 2015/0175229 A1* | 6/2015 | Chiba | B62J 1/12 297/452.18 |
| 2015/0183476 A1* | 7/2015 | Chiba | B62J 1/12 297/214 |
| 2016/0101819 A1* | 4/2016 | Iwata | B62J 1/14 280/202 |

FOREIGN PATENT DOCUMENTS

| | | |
|---|---|---|
| JP | S32-013761 U | 11/1957 |
| JP | S54-13310 Y2 | 6/1979 |
| JP | S58-68147 U | 5/1983 |
| JP | S60-113282 U | 7/1985 |
| JP | U-64-44289 | 3/1989 |
| JP | H02-11482 A | 1/1990 |
| JP | U-2-90198 | 7/1990 |
| JP | H10-167139 A | 6/1998 |
| JP | 2000-108962 A | 4/2000 |
| JP | 2002-029468 A | 1/2002 |
| JP | 2002-096793 A | 4/2002 |
| JP | 2002-211460 A | 7/2002 |
| JP | A-2006-69506 | 3/2006 |
| JP | A-2007-314021 | 12/2007 |
| JP | A-2009-154848 | 7/2009 |
| JP | A-2011-131856 | 7/2011 |
| WO | WO 03/104068 A1 | 12/2003 |

OTHER PUBLICATIONS

International Search Report issued in International Application No. PCT/JP2013/067599 mailed Sep. 24, 2013.
Jun. 14, 2016 Office Action issued in Japanese Patent Application No. 2012-145333.
Jan. 5, 2016 Office Action issued in Japanese Patent Application No. 2012-144884.
Jan. 24, 2017 Office Action issued in Japanese Patent Application No. 2012-145333.
Dec. 15, 2016 Office Action issued in U.S. Appl. No. 14/409,864.

* cited by examiner

BOTTOM-PLATE STRUCTURE FOR VEHICLE SEAT

TECHNICAL FIELD

The present invention relates to a bottom plate structure for a vehicle seat, such vehicle seat including seats of two wheeled vehicles such as motorcycles, scooters, snow mobiles and personal watercrafts, three wheeled buggies, straddle type vehicles and seats of construction machines.

BACKGROUND ART

As for vehicle seats of automatic two wheeled vehicles and the like, vehicle seats made by cushion materials being placed on bottom plates and being covered with surface material are known (for example, see Patent Document 1).

The under surface of the bottom plate of the vehicle seat disclosed in Patent Document 1 is provided with a plurality of reinforcing ribs in an integrated fashion, the ribs being arranged in a grid pattern vertically and horizontally.

PRIOR ART DOCUMENTS

Patent Documents

Patent Document 1: Japanese Unexamined Patent Application Publication No. 2007-314021

DISCLOSURE OF INVENTION

Problems to be Solved by the Invention

Since the bottom plate can be reinforced if reinforcing ribs are formed on the under surface of the bottom plate in an integrated fashion, the number of the reinforcing ribs can be increased if there is a desire to reinforce the bottom plate even more.

However, if the number of reinforcing ribs increases, there is a problem that the weight of the bottom plate will be increased.

An object of the present invention is to provide a bottom plate structure of a vehicle seat which enables reinforcement while controlling increase in its weight.

Means for Solving the Problem

In order to solve, the above problems, the invention of claim 1 is a bottom plate structure of a vehicle seat including a bottom plate and a reinforcement section, provided in the bottom plate, which intersects with a width-wise center of the bottom plate, at least a part of the reinforcement section being arranged obliquely with respect to a front-to-back direction of the vehicle seat as an oblique line, wherein a cushion material is supported on an upper surface of the bottom plate and a surface material covers the bottom plate and the cushion material, and the bottom plate is provided on a vehicle body.

The invention of claim 2 is the bottom plate structure of the vehicle seat according to claim 1, wherein the bottom plate further includes a plurality of mounting sections which are provided on a back side of the bottom plate with spaces therebetween and which are to be fixed to the vehicle body, and the reinforcement section is arranged between the plurality of mounting sections which are apart from each other.

The invention of claim 3 is the bottom plate structure of the vehicle seat according to claim 1 or 2, wherein the bottom plate further includes a plurality of reinforcement sections and an intersection formed by the plurality of reinforcement sections intersecting with each other.

The invention of claim 4 is the bottom plate structure of the vehicle seat according to claim 3, wherein the intersection is arranged on the width-wise center of the bottom plate.

The invention of claim 5 is the bottom plate structure of the vehicle seat according to claim 3 or 4, wherein the intersection is arranged avoiding a lowest position along the width-wise center of the vehicle seat in the front-to-back direction of the vehicle seat.

The invention of claim 6 is the bottom plate structure of the vehicle seat according to claim 3 or 4, wherein the intersection is arranged at a lowest position along the width-wise center of the vehicle seat in the front-to-back direction of the vehicle seat.

The invention of claim 7 is the bottom plate structure of the vehicle seat according to any one of claims 1 to 6, wherein the reinforcement section is formed so as to bulge at the back side of the bottom plate and so as to be recessed at the upper side of the bottom plate.

The invention of claim 8 is the bottom plate structure of the vehicle seat according to any one of claims 1 to 7, wherein the bottom plate further includes a rim reinforcement section provided along a periphery edge of the bottom plate, and the reinforcement section and the rim reinforcement section are connected.

The invention of claim 9 is the bottom plate structure of the vehicle seat according to claim 8, wherein a mounting section which is provided at a front end part of the bottom plate among a plurality of mounting sections abuts a fuel tank of the vehicle body, and the periphery edge of the bottom plate where the rim reinforcement section 14 is provided includes a front end rim of the bottom plate which is anterior to the mounting section which abuts the fuel tank.

The invention of claim 10 is the bottom plate structure of the vehicle seat according to claim 8 or 9, wherein the rim reinforcement section includes a main reinforcement section which is provided along a periphery edge of a part in the bottom plate corresponding to a position where a passenger sits and a step section which is provided along an entire periphery edge of the bottom plate including the main reinforcement section, an edge of the surface material being fixed to the set section, and the step section includes a bent section which forms a difference in level and which is for positioning points to fixate the edge of the surface material.

The invention of claim 11 is the bottom plate structure of the vehicle seat according to any one of claims 2 to 10, wherein the plurality of mounting sections include a plurality of outer mounting sections which are provided along a periphery edge of the bottom plate and a central mounting section which is provided on the width-wise center of the bottom plate, the central mounting section being disposed more inside than the plurality of outer mounting sections, and the reinforcement sections are arranged between the plurality of outer mounting sections and the central mounting section.

The invention of claim 12 is the bottom plate structure of the vehicle seat according to any one of claims 1 to 11, wherein the bottom plate further includes an engaging section which engages with the vehicle body, and the reinforcement section and the engaging section are connected.

The invention of claim 13 is the bottom plate structure of the vehicle seat according to any one of claims 1 to 12, wherein the cushion material is formed so as to bend at a part other than an upper layer part.

The invention of claim 14 is the bottom plate structure of the vehicle seat according to claim 13, wherein the cushion material is formed so as to bend at a lowest layer part.

The invention of claim 15 is the bottom plate structure of the vehicle seat according to claim 14 wherein the cushion material is densest as the lowest layer part.

Advantageous Effect of the Invention

According to the invention of claim 1, since the bottom plate includes a reinforcement section which intersects with the width-wise center of the bottom plate, at least a part thereof being arranged obliquely with respect to the front-to-back direction of the vehicle seat as an oblique line, the bottom plate can be reinforced by the reinforcement section. Thereby, comparing to conventional cases, the bottom plate can be reinforced while controlling the weight increase of the bottom plate.

According to the invention of claim 2, since the reinforcement section is arranged between the plurality of mounting sections which are to be fixed to the vehicle body, comparing to a case where the reinforcement section is arranged so as to bridge a plurality of points in the bottom plate that are not fixed to the vehicle body, rigidity of the bottom plate can be improved.

According to the invention of claim 3, since there are a plurality of reinforcement sections and the bottom plate further includes an intersection formed by the plurality of reinforcement sections intersecting with each other, the plurality of reinforcement sections can be arranged in different directions and rigidity of the bottom plate can be improved comparing to a case where the plurality of reinforcement sections are not intersecting with each other.

According to the invention of claim 4, since the intersection is arranged on the width-wise center of the bottom plate, rigidity at the width-wise center of the bottom plate where the load is likely to be applied can be improved.

According to the invention of claim 5, since the lowest position along the width-wise center of the bottom plate in the front-to-back direction of the bottom plate is the part where the passenger load is applied greatly and the intersection is arranged avoiding the lowest position, a comfortable sitting condition can be provided to a passenger. That is, since the part where the passenger load is applied greatly and the part where rigidity is improved by the intersection are not overlapped, a passenger can be prevented from feeling a strong uncomfortable pressure.

According to the invention of claim 6, since the lowest position along the width-wise center of the bottom plate in the front-to-back direction of the bottom plate is the part where a passenger load is applied greatly and the intersection is arranged at the lowest position, the part where a passenger load is applied greatly and the part where rigidity is improved by the intersection overlap with each other and the passenger load can be supported firmly.

According to the invention of claim 7, since the reinforcement section is formed so as to bulge at the back side of the bottom plate and so as to be recessed at the upper side of the bottom plate, a concave-convex figure can be formed in the bottom plate and rigidity of the bottom plate can be improved. Further, since reinforcement is realized in a state where the upper side of the bottom plate is partially recessed, for example, comparing to a case where the upper surface is partially bulged, bending of the cushion material which is supported by the upper surface of the bottom plate is not inhibited. Thus, a comfortable sitting condition can be provided to a passenger.

According to the invention of claim 8, since the bottom plate further includes a rim reinforcement section provided along the periphery edge of the bottom plate, rigidity at the periphery edge of the bottom plate can be improved by the rim reinforcement section. Further, by the reinforcement section and the rim reinforcement section being connected, rigidity at the width-wise center of the bottom plate and at the periphery edge of the bottom plate can be improved. Thus, the bottom plate as a whole can be reinforced.

According to the invention of claim 9, the bottom plate and the fuel tank can be prevented from interfering with each other by the mounting section at the front end part of the bottom plate. Further, since the periphery edge of the bottom plate where the rim reinforcement section is provided includes the front edge part of the bottom plate that is anterior to the mounting section which abuts the fuel tank, rigidity at the front edge part of the bottom plate can be improved by the rim reinforcement section.

According to the invention of claim 10, since the rim reinforcement section includes the main reinforcement section and the step section, rigidity along the periphery edge of the part in the bottom plate corresponding to the position where a passenger sits can be especially improved. Further, since rigidity of the entire periphery edge of the bottom plate including the main reinforcement section can be improved by the step section, rigidity of the bottom plate can be improved.

Further, since the step section includes a bent section which forms a difference in level of the step section and which is for positioning the fixation points of the edge of the surface material, the workability in manufacturing of the vehicle seat can be improved by fixing the edge of the surface material along the bent section.

According to the invention of claim 11, the central mounting section which is to be fixed to the vehicle body can be arranged on the width-wise center of the bottom plate where a load is likely to be applied. Further, since the reinforcement sections are arranged between the plurality of outer mounting sections and the central mounting section, rigidity at the part around the width-wise center of the bottom plate can be especially improved.

According to the invention of claim 12, since the reinforcement section and the engaging section which engages with the vehicle body are connected, rigidity of the engaging section where stress is likely to be concentrated can be improved by the reinforcement section.

It has been said that, in general, a passenger can sit comfortably when he/she can feel the hardness to a certain extent in a vehicle seat of a two wheeled vehicle or the like. Therefore, as in the invention of claim 13, if the cushion material is formed so as to bend at a part other than the upper layer part, the upper layer part does not bend easily and a passenger can feel the hardness to a certain extent. On the other hand, since parts other than the upper layer part are more likely to bend comparing to the upper layer part, such parts can absorb vibration and the like caused by the unevenness of the roads. Therefore, even if the cushion material is made thinner and the vehicle seat is made lighter, a stable sitting can be maintained.

According to the invention of claim 14, since the cushion material is formed so as to bend at the lowest layer part, the cushion material bends at the lowest layer part that is most distanced from the upper layer part. Therefore, the upper layer part can be prevented from deforming with the bending of the lowest layer part, and the sitting condition can be prevented from becoming uncomfortable due to bending of the lowest layer part.

For example, a cushion material made of a soft foam material such as urethane foam, polypropylene foam, polyethylene foam, etc. has a tendency to bend at the high density part, in general. Therefore, as in the invention of claim 15, if the lowest layer part of the cushion material is made to be the densest part, that alone will make the cushion material bend at the lowest layer part. That is, a cushion material that bends at the lowest layer part can be realized without considering its shape and the like.

BEST MODE FOR CARRYING OUT THE INVENTION

First Embodiment

Hereinafter, the first embodiment of the present invention will be described with reference to the drawings.

Figure 1:
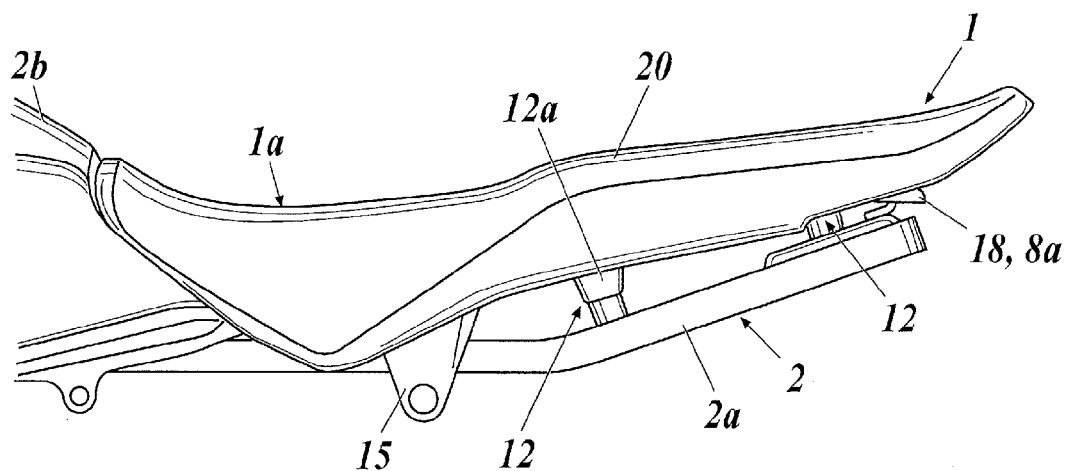
FIG. 1 is a side view of a vehicle seat according to the first embodiment.

In FIG. 1, the reference numeral 1 indicates a vehicle seat. The vehicle seat 1 of the embodiment is to be used in an automatic two wheeled vehicle.

Here, the vehicle seat is not limited to the seats used in automatic two wheeled vehicles as in the embodiment. The vehicle seat includes seats of two wheeled vehicles such as motorcycles, scooters, snow mobiles and personal watercrafts, three wheeled buggies, straddle type vehicles, seats of construction machines, four wheeled vehicles, etc.

The vehicle seat 1 includes a bottom plate 10 which is provided on a vehicle body 2 of an automatic two wheeled vehicle, a cushion material 20 which is supported by the upper surface of the bottom plate 10 and a surface material 3 which covers the bottom plate 10 and the cushion material 20. That is, the vehicle seat 1 is formed by the cushion material 20 being supported on the bottom plate 10 and the cushion material 20 and the bottom plate 10 being covered with the surface material 3.

The parts of the vehicle body 2 where the bottom plate 10 is to be fixed are, in particular, the seat rail 2a which is laid on the vehicle body 2 and the fuel tank 2b in front of the vehicle seat 1.

The bottom plate 10 is formed by a resin material such as polypropylene, polyvinylchloride, etc., and is formed in a shape corresponding to the shape of the vehicle body 2 of the automatic two wheeled vehicle. The bottom plate 10 is attached to the vehicle body 2.

The bottom plate 10 of the embodiment is formed by using polypropylene as a material, for example. In order to fixate the bottom plate 10 to the vehicle body 2 of the automatic two wheeled vehicle, the polypropylene is to be especially hard. The bottom plate 10 may be provided with clasps or the like necessary to be fixed to the vehicle body 2 of the automatic two wheeled vehicle.

The cushion material 20 is formed of a soft foam material such as, for example, urethane foam, polypropylene foam or polyethylene foam. As for the cushion material 20 of the embodiment, for example, urethane foam is used.

Since the cushion material 20 is supported by the upper surface of the bottom plate 10, the under surface of the cushion material 20 is formed in a shape reflecting the shape of the upper surface of the bottom plate 10. Thereby, the cushion material 20 can be supported stably by the upper surface of the bottom plate 10. The surfaces of the bottom plate 10 and the cushion material 20 which contact each other, that is, the upper surface of the bottom plate 10 and the under surface of the cushion material 20 are referred to as the reference surfaces 10*a* and 20*a*, respectively.

The cushion material 20 is formed so that the part in the upper surface thereof where a passenger who drives the automatic two wheeled vehicle sits is lower than the other portion when seen from a side. This part is referred to as the lowest position 1*a* that is the lowest along the width-wise center C2 of the vehicle seat 1 in the front-to-back direction of the vehicle seat 1. The part near the lowest position 1*a* corresponds to the ischium position of the passenger who drives the automatic two wheeled vehicle and is the maximum load section where a great portion of the load of a passenger is applied in the vehicle seat 1.

On the back side of the cushion material 20, a plurality of concave sections 21 are formed as space sections which are opened toward the bottom plate 10 in order to save weight and improve likeliness to bend in the cushion material 20.

Figure 6:
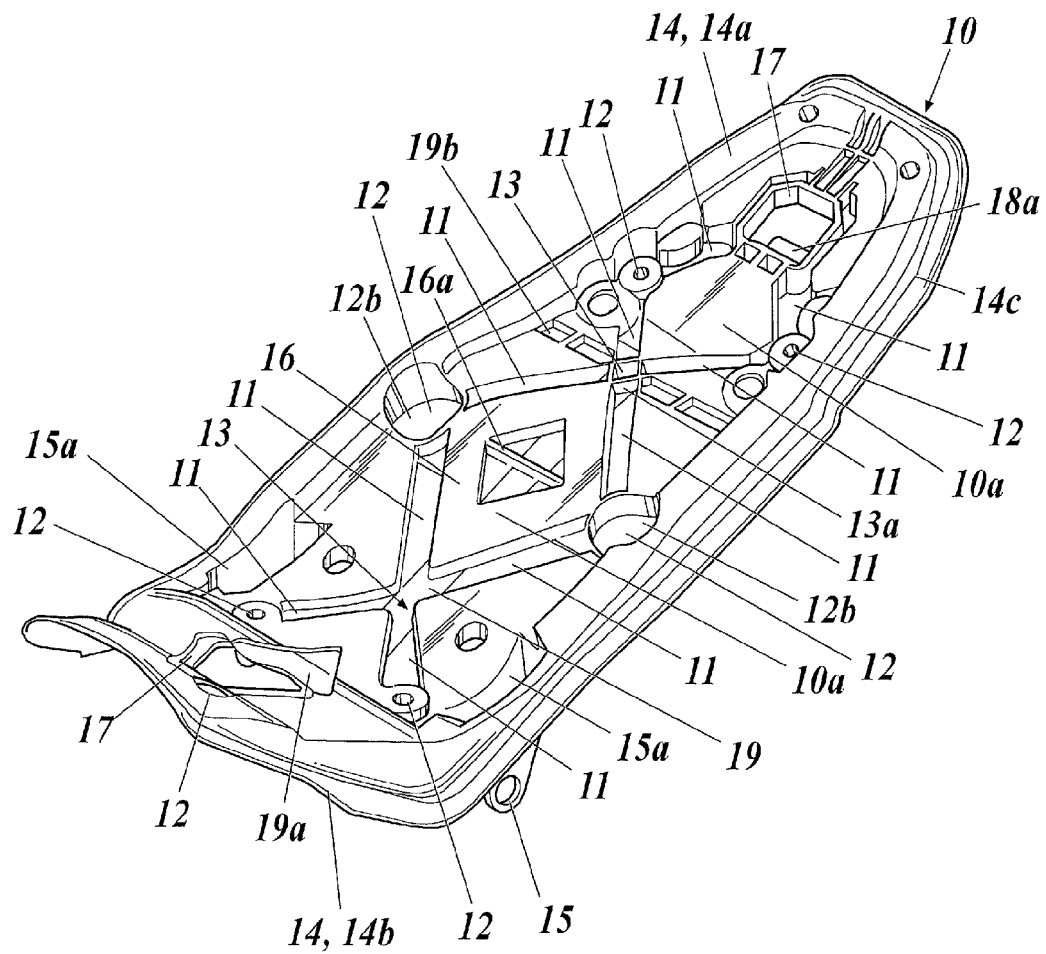
FIG. 6 is a schematic view of the bottom plate according to the first embodiment.
Figure 7:
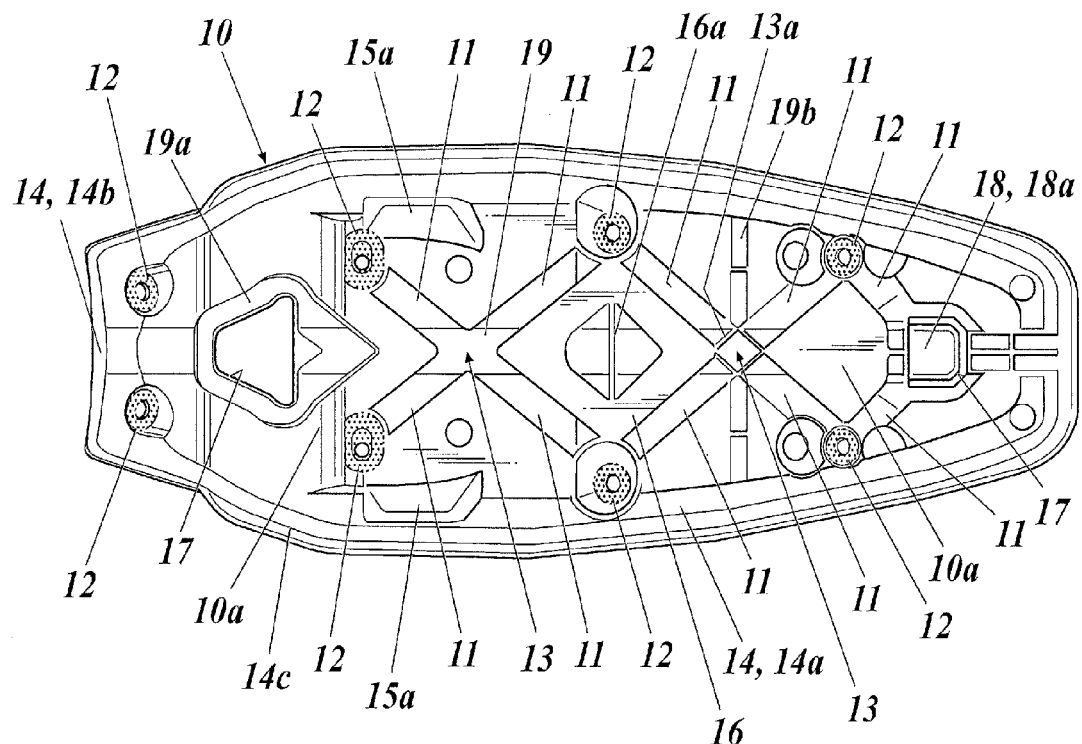
FIG. 7 is a plan view of the bottom plate according to the first embodiment.
Figure 8:
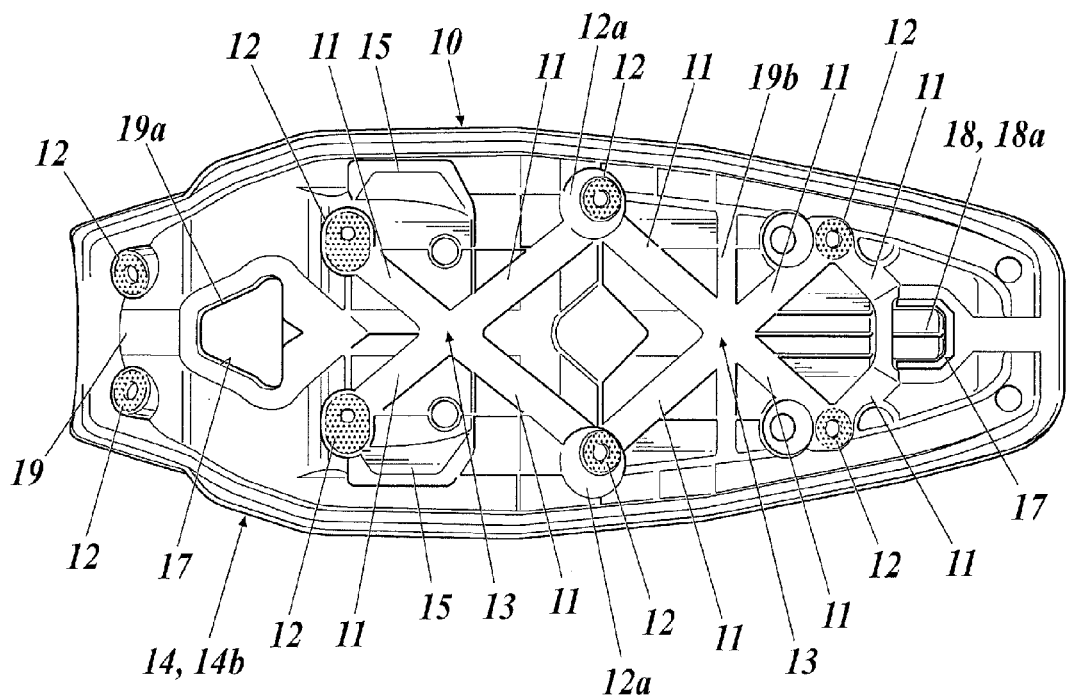
FIG. 8 is a underside of the bottom plate according to the first embodiment.

Since a porous material such as urethane foam or the like is used for the cushion material 20 as described above, air enters in and exits from the pores of the cushion material 20 when the cushion material 20 bends and recovers from the bent state. On the other hand, since the cushion material 20 is supported by the upper surface of the bottom plate 10 and is covered with the surface material 3, there is a possibility that the air flow is disrupted. In order to control such disruption, it is preferred to have a plurality of through holes 17 and 17 formed in the bottom plate 10 as air flow paths as shown in FIGS. 6 to 8.

The surface material 3 constitutes the sitting surface of the vehicle seat 1. The surface material 3 is where comes in contact with a passenger and is formed by a resin material such as polypropylene, polyvinylchloride or the like. As for the surface material 3 of the embodiment, for example, a hard material made of polypropylene is used.

Figure 5:
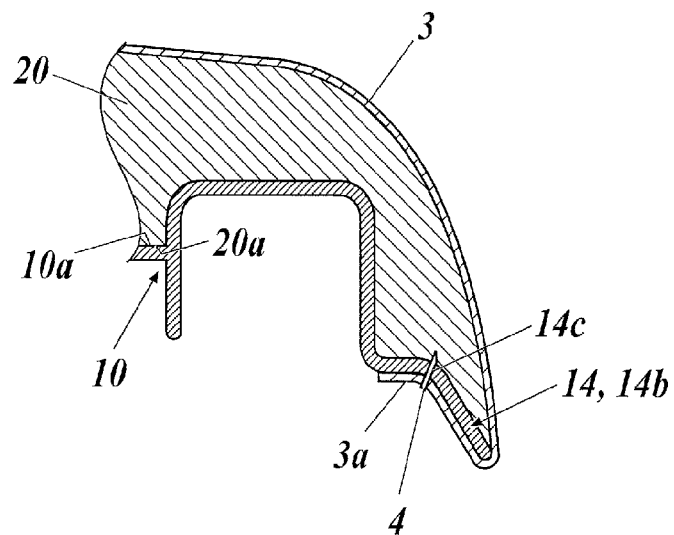
FIG. 5 is an enlarged cross-sectional view of a part of the vehicle seat according to the first embodiment.

As shown in FIG. 5, the edge 3*a* of the surface material 3 is folded in to the back side of the bottom plate 10 and is fixed to the back side of the bottom plate 10 by staples 4.

The edge 3*a* of the surface material 3 refers to the entire periphery edge of the surface material 3. Therefore, the edge 3*a* of the surface material 3 is fixed along the entire periphery edge of the bottom plate 10.

Next, the bottom plate 10 will be described in more detail.

The bottom plate 10 includes a reinforcement section 11 which intersects with the width-wise center C1 of the bottom plate 10, at least apart thereof being arranged obliquely with respect to the front-to-back direction of the vehicle seat as an oblique line.

Figure 9:
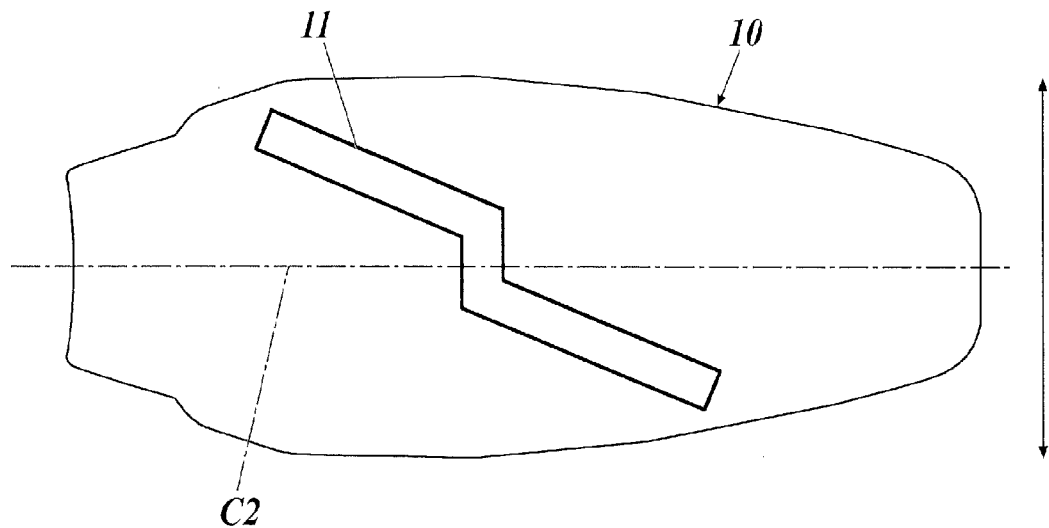
FIG. 9 is a diagram for explaining an example of a reinforcement section according to the first embodiment.

For example, the reinforcement section 11 may be in a state as shown in FIG. 9. That is, the reinforcement section 11 is not merely arranged vertically or horizontally (from front to rear or from side to side) of the bottom plate 10. By the reinforcement section 11 including a part that is arranged obliquely, it is expected to obtain rigidity in the right-to-left direction.

Although one reinforcement section 11 is formed in the bottom plate 10 shown in FIG. 9, this is not limitative in any way. As shown in other drawings, a plurality of reinforcement sections may be formed in the bottom plate 10.

Figure 2:
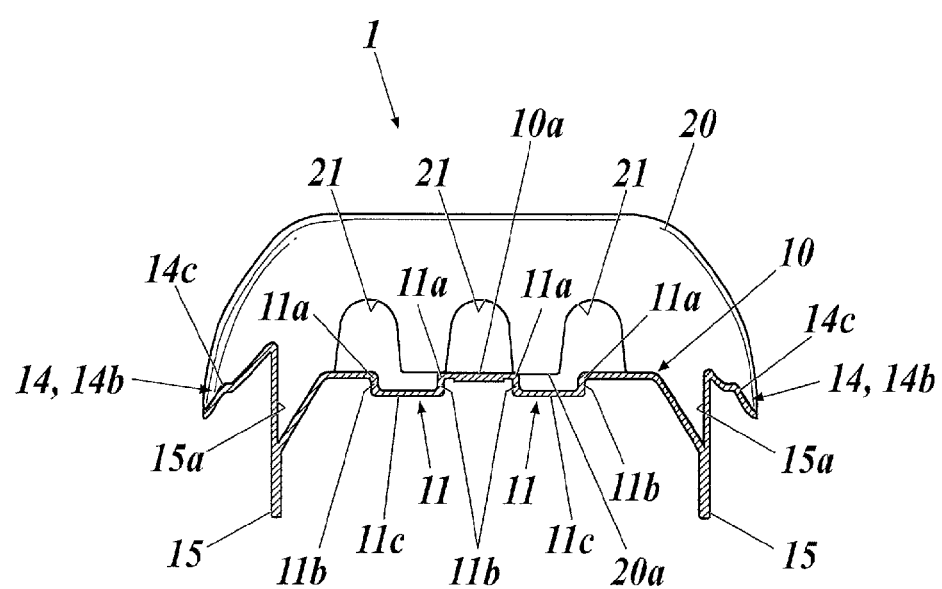
FIG. 2 is a cross-sectional view of the vehicle seat according to the first embodiment.
Figure 3:
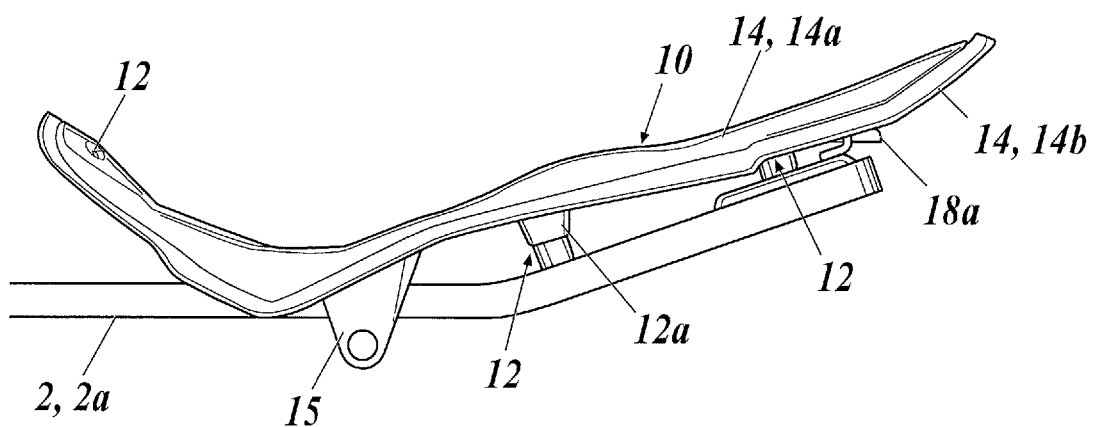
FIG. 3 is a side view of a bottom plate according to the first embodiment.

The reinforcement sections 11 of the embodiment bulge at the back side of the bottom plate 10 and are recessed at the upper side of the bottom plate 10. That is, as shown in FIG. 2, each reinforcement section 11 is formed in a cross-sectional concave shape and includes a pair of side walls 11*b* and 11*b* each of which formed by being bent downward from the upper surface of the bottom plate 10 and the bottom which is formed in an integrated fashion being bridged between the lower edges of the side walls 11*b* and 11*b* that form a pair. Corners where the bottom plate 10 is turned downward from the upper surface thereof are referred to as turning sections 11*a* and are the parts in the reinforcement sections 11 having high rigidity.

The upper side of the bottom plate 10 includes the upper surface of the bottom plate 10 and the upper side of the step section 14*b* (described later) which is formed along the entire periphery edge of the bottom plate 10 and which is bent toward the vehicle body 2 more than the upper surface of the bottom plate 10. On the other hand, the back side of the bottom plate 10 is the back of the upper side of the bottom plate 10 and includes the under surface of the bottom plate 10 and the back side of the step section 14*b*.

According to the above described reinforcement sections 11, a concavo-convex figure is formed in the bottom plate 10 leading to improvement in rigidity of the bottom plate 10. Further, since the bottom plate 10 can be reinforced in a state where the upper side thereof is partially recessed, bending of the cushion material 20 which is supported by the upper surface of the bottom plate 10 is not inhibited comparing to a case where the bottom plate 10 is reinforced in a state where the upper side thereof is partially bulged. Therefore, a comfortable sitting condition can be provided to a passenger.

Although the reinforcement sections 11 are formed in a cross-sectional concave shape in the embodiment, this is not limitative in any way. The reinforcement sections 11 may be formed in a protruding shape such as a rib on the back side of the bottom plate 10.

As shown in FIGS. 6 to 8, the bottom plate 10 is provided with a plurality of mounting sections 12 through which the bottom plate 10 is fixed to the vehicle body 2, the mounting sections 12 being formed on the back side of the bottom plate 10 with spaces therebetween.

The mounting sections 12 refer to the parts which are to be fixed to the vehicle body 2 themselves and also to elastic members such as rubbers attached to the above parts and the parts where the elastic members are to be attached. These elastic members are fixed to the bottom side of the bottom plate 10 by welding or the like, for example. Insertion holes may be formed in the bottom plate 10 and inserting sections which can be inserted in to the insertion holes may be formed at the elastic members of the mounting sections 12, and the elastic members of the mounting sections 12 may be fixed to the bottom plate 10 by the inserting sections being inserted in and engaged with the insertion holes.

In each of the elastic members of the mounting sections 12, a bolt hole is formed near the center thereof. The bottom plate 10 can be fixed to the seat rail 2*a* of the vehicle body 2 by the bolts which are inserted through the bolt holes.

With respect to a part where the distance to the seat rail 2a is long, a leg section 12a is formed on the back side of the bottom plate 10 in an integrated fashion and an elastic member of a mounting section 12 is fixed at the tip of the leg section 12a. That is, such mounting section 12 includes the leg section 12a.

The leg section 12a is formed so as to be recessed at the upper side of the bottom plate 10. That is, the leg section 12a includes a concave section 12b which is recessed at the upper side of the bottom plate 10.

The plurality of mounting sections 12 of the embodiment are symmetrically arranged at eight points on the back side of the bottom plate 10. Pairs of mounting sections 12 and 12 are arranged in four rows along the front-to-back direction of the bottom plate 10, the mounting sections 12 and 12 forming each pair are arranged widthwise.

The reinforcement sections 11 are arranged between the plurality of mounting sections 12 and 12 which are arranged having spaces therebetween. Such arrangement includes a case where the mounting sections 12 are respectively arranged at the ends of the reinforcement sections 11 shown in FIG. 9.

Comparing to a case where the reinforcement sections 11 are arranged between a plurality of points which are not the points through where the bottom plate 10 is fixed to the vehicle body 2, the above described arrangement allows rigidity of the bottom plate 10 to be improved more. That is, reinforcement efficiency is greater in the vicinities of the mounting sections 12 where stress is applied in a case where the reinforcement sections 11 are arranged so as to connect the mounting sections 12 and 12 comparing to a case where the reinforcement sections 11 are arranged avoiding the mounting sections 12 and 12 which are fixed to the vehicle body 2.

Figure 11:
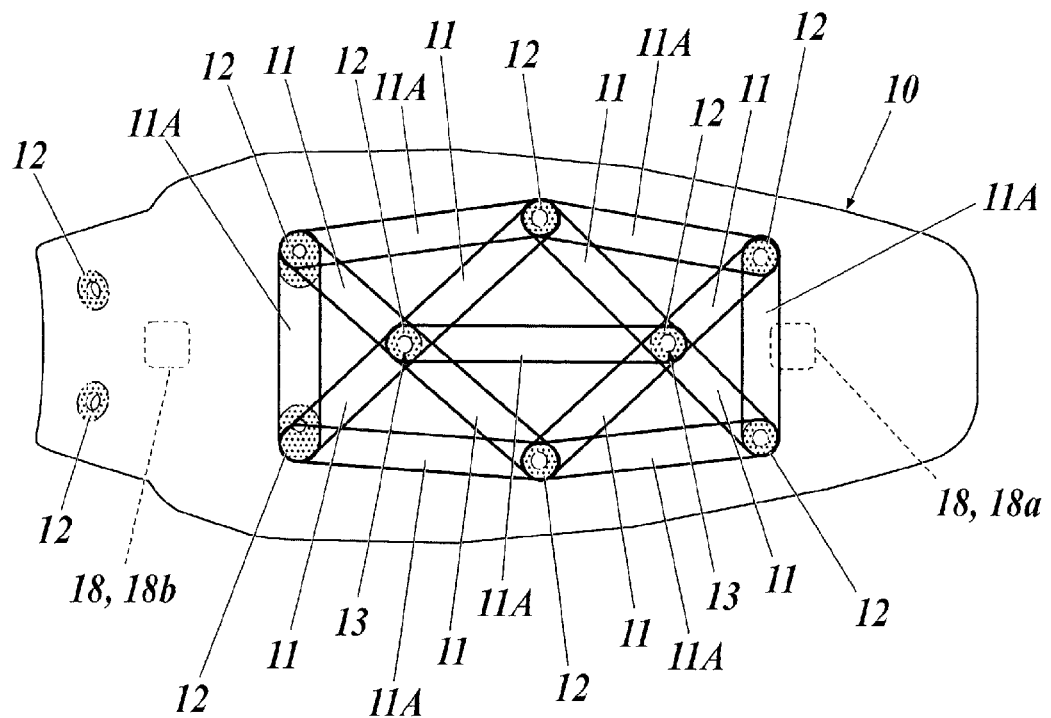
FIG. 11 is a diagram for explaining an example of reinforcement sections according to the first embodiment.

Although the plurality of mounting sections 12 are provided at eight points along the inner periphery of the bottom plate 10 in the embodiment, this is not limitative in any way. For example, as shown in FIG. 11, the mounting sections 12 may also be provided along the width-wise center C1 of the bottom plate 10.

For example, the plurality of mounting sections 12 include a plurality of outer mounting sections 12 which are provided along the inner periphery of the bottom plate 10 and a central mounting section 12 which is provided on the width-wise center C1 of the bottom plate 10 more inside than the plurality of outer mounting sections 12. That is, the central mounting section 12 which is to be fixed to the vehicle body 2 can be disposed on the width-wise center C1 which is the part in the bottom plate 10 where load is most likely to be applied.

In such case, the reinforcement sections 11 are also arranged between the plurality of outer mounting sections 12 and the central mounting section 12. Here, in the embodiment, two central mounting sections 12 are provided along the width-wise center C2 of the bottom plate 10 and the reinforcement sections 11 are provided between the two central mounting section 12 and 12 and the outer mounting sections 12 at six points along the inner periphery of the bottom plate 10, the bottom plate 10 being provided with a plurality of central mounting sections 12. In such way, especially, rigidity around the width-wise center C1 of the bottom plate 10 can be improved.

In the embodiment, the bottom plate 10 is provided with a plurality of reinforcement sections 11 as shown in FIGS. 6 and 8. The bottom plate 10 further includes intersections 13 where the plurality of reinforcement sections 11 intersect with each other. That is, the plurality of reinforcement sections 11 are made to intersect with each other and are arranged in different directions. Comparing to a case where the plurality of reinforcement sections 11 are not made to intersect with each other, in the above arrangement, rigidity of the bottom plate can be improved more.

The plurality of reinforcement sections 11 of the embodiment are symmetrically arranged when being arranged in different directions.

Further, in the embodiment, the bottom plate 10 is provided with a plurality of intersections 13.

Since the plurality of intersections 13 and 13 are formed by making the plurality of reinforcement sections 11 intersect with each other, similarly to the plurality of reinforcement sections 11, the intersections are formed so as to bulge at the back side of the bottom plate 10 and so as to be recessed at the upper side of the bottom plate 10.

On the upper side of one of the plurality of intersections 13 and 13, reinforcement ribs 13a for improving rigidity at the intersection 13 are formed in an integrated manner. The reinforcement ribs 13a are provided so as to be on the same straight lines of the side walls 11b of the intersecting two reinforcement sections 11 and 11. In the embodiment, four reinforcement ribs 13a are provided, and the four reinforcement ribs 13a form a diamond shape at the intersection 13. Further, the upper surfaces of the reinforcement ribs 13a are flush with the upper surface of the bottom plate 10.

The plurality of intersections 13 and 13 are arranged along the width-wise center C1 of the bottom plate 10.

Figure 10:
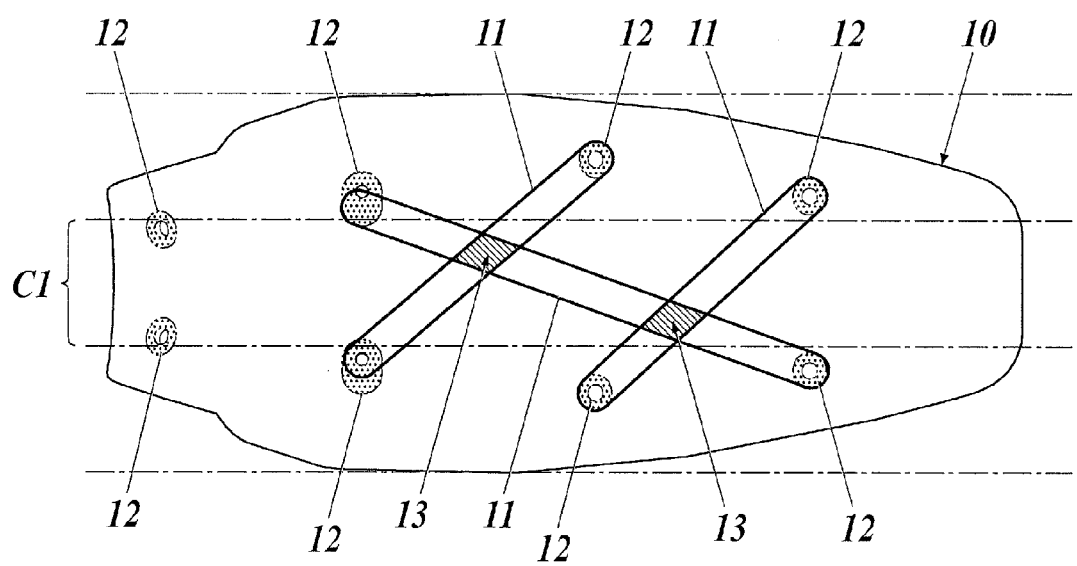
FIG. 10 is a diagram for explaining an example of reinforcement sections according to the first embodiment.

For example, the above arrangement also includes the arrangement shown in FIG. 10. That is, although the plurality of reinforcement sections 11 of FIG. 10 are not arranged symmetrically, the plurality of intersections 13 and 13 are arranged at the width-wise center C1 of the bottom plate 10. On the other hand, as shown in FIG. 7, the plurality of intersections 13 and 13 of the embodiment are arranged at the width-wise center C1 of the bottom plate 10 since the plurality of reinforcement sections 11 are arranged symmetrically.

In such way, by the plurality of intersections 13 and 13 being arranged at the width-wise center C1 of the bottom plate 10, rigidity at the width-wise center C1 in the bottom plate 10 where load is likely to be applied can be improved.

Further, the plurality of intersections 13 and 13 are arranged avoiding the lowest position 1a in the bottom plate 10. The lowest position 1a in the bottom plate 10 is the maximum load section where a great portion of the load of a passenger is applied. The intersections 13 are the parts in the bottom plate 10 where rigidity is improved. Therefore, the position where the passenger load is applied greatly and the parts where rigidity is improved by the intersections 13 do not overlap. Thereby, the passenger can be prevented from feeling a strong uncomfortable pressure and a comfortable sitting condition can be provided to the passenger.

In the embodiment, as shown in FIG. 7, the front side intersection 13 of the plurality of intersections 13 and 13 is disposed between the mounting sections 12 and 12 of the second row and the mounting sections 12 and 12 of the third row, the rows being counted from the front. On the other hand, the lowest position 1a, which is the maximum load section, is between the mounting sections 12 and 12 of the first row and the mounting sections 12 and 12 of the second row, the rows being counted from the front. Thus, the intersection 13 is arranged avoiding the lowest position 1a which is the maximum load section.

Although the plurality of intersections 13 and 13 are arranged avoiding the lowest position 1a in the bottom plate 10 in the embodiment, this is not limitative in any way. That is, the plurality of intersections 13 and 13 may be arranged at the lowest position 1a of the bottom plate 10. Thereby, since the part where the passenger load is applied greatly and the part where rigidity is improved by the intersection 13 overlap, the passenger load can be supported surely.

The bottom plate 10 further includes an engaging section 18 which engages with the vehicle body 2. As for the engaging section 18, as shown in FIG. 11, a claw section 18a or a striker 18b provided at the front end or the rear end of the bottom plate 10 are suggested, for example. Although it is not shown in the drawings, the vehicle body 2 may be provided with an engagement section where engages with the claw section 18a or the striker 18b.

With respect to the engaging section 18 of the embodiment, as shown in FIGS. 4 and 6 to 8, the claw section 18a is provided at the position of the through hole 17 at the rear end of the bottom plate 10.

Further, the reinforcement sections 11 and the claw section 18a of the engaging section 18 are connected. That is, two reinforcement sections 11 are arranged toward the claw section 18a from the mounting sections 12 and 12 of the fourth row counting from the front and the ends of the two reinforcement sections 11 and 11 are at the base end section of the claw section 18a.

Since the reinforcement sections 11 and 11 are connected to the claw section 18a which is the engaging section 18 that engages with the vehicle body 2, rigidity of the claw section 18a which is the engaging section where stress is likely to be concentrated can be improved by the reinforcement sections 11 and 11.

The bottom plate 10 includes a way to improve rigidity of the bottom plate 10 other than the reinforcement sections 11.

As one way, the bottom plate 10 includes a rim reinforcement section 14 along the rim of the bottom plate 10 as shown in FIGS. 3, 6 to 8. The rim of the bottom plate refers to the entire periphery edge of the bottom plate 10. That is, by such rim reinforcement section 14, rigidity of the entire periphery edge of the bottom plate 10 can be improved.

As shown in FIGS. 6 to 8, the rim reinforcement section 14 and the leg sections 12a, 12a are formed in an integrated fashion. Then, the plurality of reinforcement sections 11 and the rim reinforcement section 14 are connected via the leg sections 12a, 12a. In other words, since the plurality of reinforcement sections 11 intersect with each other, all of the plurality of reinforcement sections 11 are connected to the rim reinforcement section 14.

Due to the plurality of reinforcement sections 11 and the rim reinforcement section 14 being connected, rigidity at the width-wise center C1 of the bottom plate 10 and at the rim of the bottom plate 10 can be improved. Therefore, the bottom plate 10 as a whole can be reinforced.

The bottom plate 10 includes a pair of projection sections 15 and 15 which project toward the vehicle body 2 and are to be fixed to the vehicle body 2. The projection sections 15 and 15, which forms a pair, are respectively arranged near the mounting sections 12, 12 of the second row.

Similarly to the leg sections 12a, 12a, the pair of projection sections 15, 15 and the rim reinforcement section 14 are also formed in an integrated fashion. Therefore, by arranging the pair of projection sections 15, 15 and the mounting sections 12 and 12 of the second row close to each other to the extent that they can be formed in an integrated fashion, the plurality of reinforcement sections 11 and the rim reinforcement section 14 can be connected via the pair of projection sections 15, 15. This is preferable in view of improving rigidity of the bottom plate 10.

The pair of projection sections 15, 15 are formed so as to be recessed at the upper side of the bottom plate 10. That is, each of the projection sections 15, 15 which form a pair is provided with a concave section 15a which is recessed at the upper side of the bottom plate 10.

Figure 4:
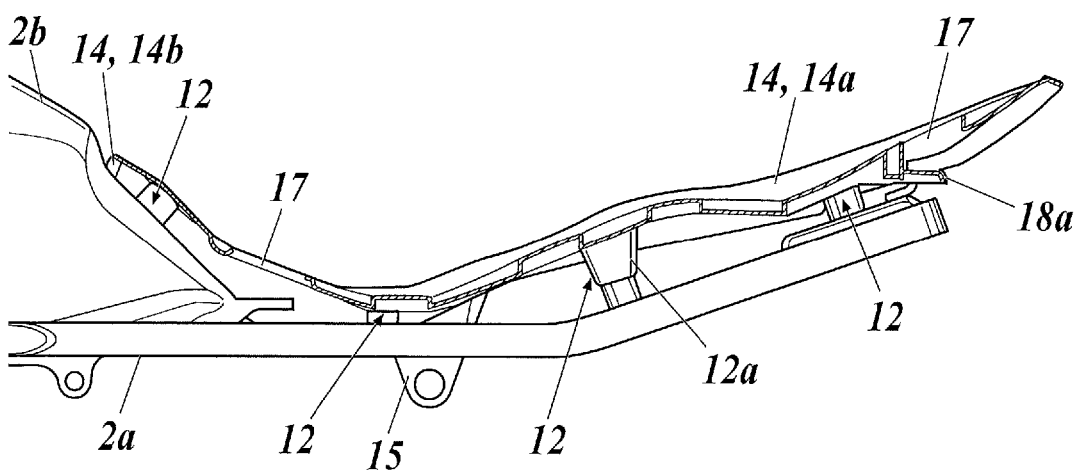
FIG. 4 is a side view of the bottom plate according to the first embodiment.

Among the plurality of mounting sections 12, the mounting sections 12, 12 at the front end part (in the first row counting from the front) of the bottom plate 10 abuts the fuel tank 2b of the vehicle body 2 as shown in FIG. 4. These mounting sections 12, 12 of the first row are not fixed to the fuel tank 2b with bolts and are not fixed to the seat rail 2a.

By the mounting sections 12, 12 of the first row, the fuel tank 2b and the bottom plate 10 can be prevented from interfering with each other. In association with the above, a space is formed between the fuel tank 2b and the back side of the bottom plate 10. On the other hand, the periphery edge of the bottom plate 10 where provided with the rim reinforcement section 14 includes the front end part of the bottom plate 10 anterior to the mounting sections 12, 12 which are in contact with the fuel tank 2b. Thereby, rigidity at the front end part of the bottom plate can be improved by the rim reinforcement section 14. Therefore, even if a space is formed between the fuel tank 2b and the back side of the bottom plate 10 as described above, breaking or the like of the front end part of the bottom plate 10 can be prevented.

Further, as shown in FIGS. 2 to 8, in particular, the rim reinforcement section 14 includes a main reinforcement section 14a which is provided along the periphery edge of the part corresponding to the position where a passenger sits in the bottom plate 10 and a step section 14b which is provided along the entire periphery edge of the bottom plate 10 including the main reinforcement section 14a. The edge of the surface material 3 is fixed to the step section 14b.

In the bottom plate 10, the part corresponding to the position where a passenger sits is more in the rear than the part where a passenger who drives the automatic two wheeled vehicle sits (the lowest position 1a). That is, since the part anterior to the lowest position 1a is right above the fuel tank 2b, this position is not preferable as the position where a passenger sits.

Therefore, the main reinforcement section 14a is provided posterior to the lowest position 1a in the bottom plate 10 so as to surround the edge of the bottom plate 10. In other words, with the main reinforcement section 14a, rigidity at the rim of the part corresponding to the position where a passenger sits in the bottom plate 10 can be improved in particular.

On the other hand, the step section 14b is arranged at the edge that is outside than the main reinforcement section 14a. Thereby, rigidity of the entire rim of the bottom plate 10 including the main reinforcement section 14a can be improved by the step section 14b. Therefore, rigidity of the bottom plate 10 can also be improved. In other words, even if the automatic two wheeled vehicle is pulled up with a finger by the rim of the bottom plate 10 when pulling it up, the bottom plate 10 can be prevented from deforming due to the weight of the automatic two wheeled vehicle.

As shown in FIG. 5, the step section 14b includes a bent section 14c which forms a difference in level of the step section 14b and which is for positioning the fixation points of the edge 3a of the surface material 3. That is, the edge of the bottom plate 10 is formed to have a step section by the material being bent. In the step section 14b which is formed to have a difference in level, the bent section 14c is where an internal angle is formed on the back side of the bottom plate 10. The edge 3a of the surface material 3 is fixed to the bent section 14c by staples 4. That is, the bent section 14c is the positioning section for staples 4, and workability relating to manufacturing of the vehicle seat 1 can be improved by fixing the edge 3a of the surface material 3 along the bent section 14c.

As a way to improve rigidity of the bottom plate 10, the bottom plate 10 includes a reinforcement convex section 16 as shown in FIGS. 6 and 7.

The reinforcement convex section 16 is provided at the center part of the bottom plate 10 where surrounded by the plurality of reinforcement sections 11 which are connected to the mounting sections 12, 12 of the third row. That is, the reinforcement convex section 16 is formed adjacent to the reinforcement sections 11 as a convex section with respect to the reinforcement sections 11 which are formed to have a cross-sectional concave shape. Here, the reinforcement convex section 16 is formed so as to be recessed at the back side of the bottom plate 10.

The center part of the reinforcement convex section 16 is formed in an approximate diamond shape so as to be recessed at the upper side of the bottom plate 10. Thereby, the reinforcement convex section 16 itself is formed in an approximate diamond shape. On the surface of the diamond shape recessed section at the center of the reinforcement convex section 16, a reinforcement rib 16a for improving rigidity at the diamond shaped recessed section is formed in an integrated fashion.

Further, as a way to improve rigidity of the bottom plate 10, the bottom plate 10 includes various types of concave and convex sections as shown in FIGS. 6 to 8.

As such various types of concave and convex sections, a belt-like bead 19 which is a convex section formed intermittently along the width-wise C2 of the bottom plate 10, a concave section 19a formed around the front side through hole 17 of the bottom plate 10, a concave section 19b which intersects the rear side intersection 13 of the bottom plate 10 from left to right, etc. are suggested, for example. Here, the upward bulging of the belt-like bead 19 is to be lower than the height of the side walls 11b of the reinforcement sections 11. That is, the upper surface of the belt-like bead 19 is arranged to be lower than the upper surface of the bottom plate 10. In addition, the bottom plate 10 may be provided with concave and convex sections as needed.

Due to the bottom plate 10 being provided with various types of concave and convex sections 19, 19a and 19b, rigidity at the parts where the reinforcement sections 11 are not arranged can be improved. Therefore, the bottom plate 10 as a whole can be reinforced.

Furthermore, as a way to improve rigidity of the bottom plate 10, the bottom plate 10 may include sub reinforcement sections 11A as shown in FIG. 11.

The sub reinforcement sections 11A are formed in a cross-section concave shape similar to the reinforcement sections 11, and the widths thereof are also approximately the same size as the bottoms 11c, for example. Differently from the reinforcement sections 11, the sub reinforcement sections 11A are formed so as not to intersect with the width-wise center C1 of the bottom plate 10 and are not arranged diagonally with respect to the front-to-back direction of the vehicle seat. That is, they are arranged at the parts where the reinforcement sections 11 are not arranged.

In the embodiment, the sub reinforcement sections 11A are respectively arranged in the left-to-right direction between the mounting sections 12, 12 of the second row and between the mounting sections 12, 12 of the fourth row. Further, the sub reinforcement sections 11A are respectively arranged between the mounting sections 12, 12 of the second row and the mounting sections 12, 12 of the third row, and between the mounting sections 12, 12 of the third row and the mounting sections 12, 12 of the fourth row. Furthermore, the sub reinforcement section 11A is arranged between the two central mounting sections 12, 12.

By forming the reinforcement sections 11 and the sub reinforcement sections 11A in the bottom plate 10, rigidity of the bottom plate 10 can be greatly improved, and thus, such configuration is preferable.

According to the embodiment, since the bottom plate 10 includes a reinforcement section 11 (a plurality of reinforcement sections 11) which intersects with the width-wise center C1 of the bottom plate 10, at least a part thereof being arranged obliquely with respect to the front-to-back direction of the vehicle seat 1 as an oblique line, the bottom plate 10 can be reinforced by the reinforcement section 11 (the plurality of reinforcement sections 11). Thereby, comparing to a conventional case, the bottom plate 10 can be reinforced while controlling the weight increase of the bottom plate 10. Eventually, leading to controlling of the weight increase of the vehicle seat 1 itself.

Second Embodiment

Figure 12:
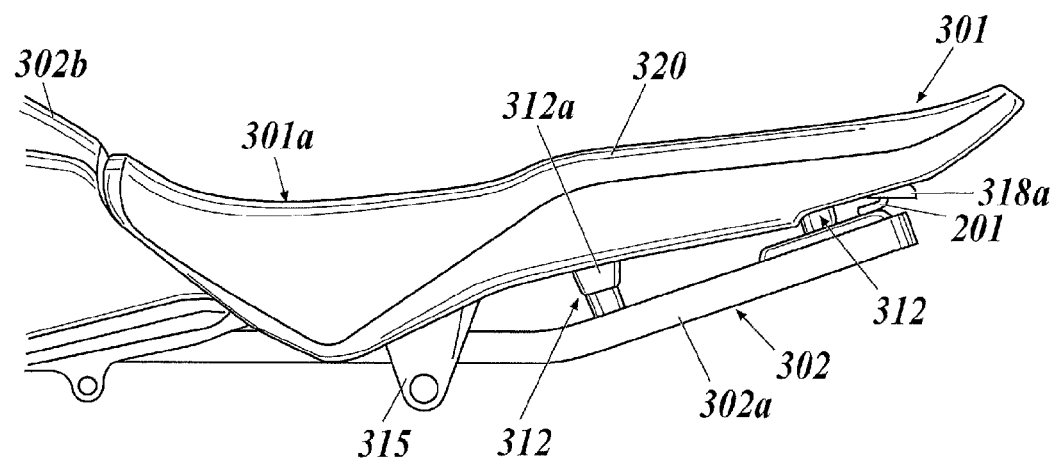
FIG. 12 is a side view of a vehicle seat according to the second embodiment.

In FIG. 12, the reference numeral 301 indicates a vehicle seat provided with a bottom plate structure according to the present invention. The vehicle seat 301 of the embodiment is to be used in an automatic two wheeled vehicle.

Here, the vehicle seat is not limited to the seats used in automatic two wheeled vehicles as in the embodiment. The vehicle seat includes seats of two wheeled vehicles such as motorcycles, scooters, snow mobiles and personal watercrafts, three wheeled buggies, straddle type vehicles, seats of construction machines, four wheeled vehicles, etc.

The vehicle seat 301 includes a bottom plate 310 which is provided on the vehicle body 302 of the automatic two wheeled vehicle, a cushion material 320 which is supported by the upper surface of the bottom plate 310 and a surface material 303 which covers the bottom plate 310 and the cushion material 320. That is, the vehicle seat 301 is formed by the cushion material 320 being supported on the bottom plate 310 and the cushion material 320 and the bottom plate 310 being covered with the surface material 303.

The parts of the vehicle body 302 where the bottom plate 310 is to be fixed are, in particular, the seat rail 302a which is laid on the vehicle body 302 and the fuel tank. 302b in front of the vehicle seat 301.

The bottom plate 310 is formed by a resin material such as polypropylene, polyvinylchloride, etc., and is formed in a shape corresponding to the shape of the vehicle body 302 of the automatic two wheeled vehicle. The bottom plate 310 is attached to the vehicle body 302.

The bottom plate 310 of the embodiment is formed by using polypropylene as a material, for example. In order to fixate the bottom plate 310 to the vehicle body 302 of the automatic two wheeled vehicle, the polypropylene is to be especially hard. The bottom plate 310 may be provided with clasps or the like necessary to be fixed to the vehicle body 302 of the automatic two wheeled vehicle.

The cushion material 320 is formed of a soft foam material such as, for example, urethane foam, polypropylene foam or polyethylene foam. As for the cushion material 320 of the embodiment, for example, urethane foam is used.

Since the cushion material 320 is supported by the upper surface of the bottom plate 310, the under surface of the cushion material 320 is formed in a shape reflecting the shape of the upper surface of the bottom plate 310. Thereby, the cushion material 320 can be supported stably by the upper surface of the bottom plate 310. The surfaces of the bottom plate 310 and the cushion material 320 which contact each other, that is, the upper surface of the bottom plate 310 and the under surface of the cushion material 320 are referred to as the reference surfaces 310a and 320a, respectively.

The cushion material 320 is formed so that the part in the upper surface thereof where a passenger who drives the automatic two wheeled vehicle sits is lower than the other portion when seen from a side. This part is referred to as the lowest position 301a that is the lowest along the width-wise center C2 of the vehicle seat 301 in the front-to-back direction of the vehicle seat 301. The part near the lowest position 301a corresponds to the ischium position of the passenger who drives the automatic two wheeled vehicle and is where the maximum load is applied in the vehicle seat 301.

The surface material 303 constitutes the sitting surface of the vehicle seat 301. The surface material 303 is where comes in contact with a passenger and is formed by a resin material such as polypropylene, polyvinylchloride or the like. As for the surface material 303 of the embodiment, for example, a hard material made of polypropylene is used.

Figure 14:
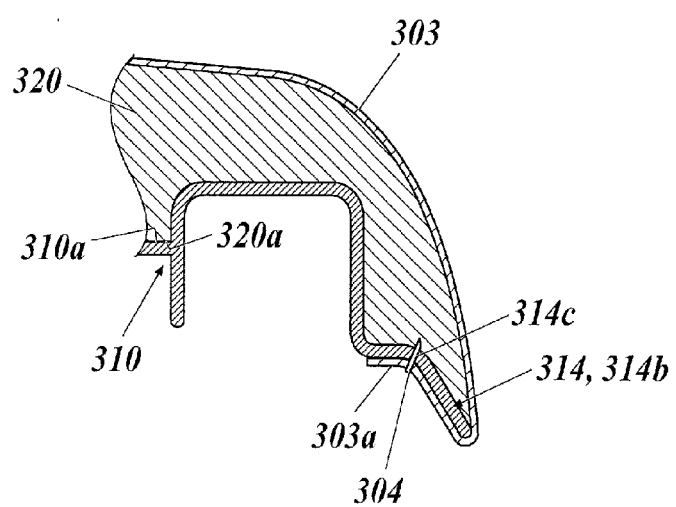
FIG. 14 is an enlarged cross-sectional view of a part of the vehicle seat according to the second embodiment.

As shown in FIG. 14, the edge 303a of the surface material 303 is folded in to the back side of the bottom plate 310 and is fixed to the back side of the bottom plate 310 by staples 304.

The edge 303a of the surface material 303 refers to the entire periphery edge of the surface material 303. Therefore, the edge 303a of the surface material 303 is fixed along the entire periphery edge of the bottom plate 310.

Next, the bottom plate 310 will be described in more detail.

The bottom plate 310 includes a plurality of reinforcement sections 311 which intersect with the width-wise center C1 of the bottom plate 310, each of which having at least a part thereof arranged obliquely with respect to the front-to-back direction of the vehicle seat as an oblique line. That is, the reinforcement sections 311 are not merely arranged vertically and horizontally (from front to back and from side to side) of the bottom plate 310. By the reinforcement sections 311 including parts that are arranged obliquely, it is expected to obtain rigidity in the front-to-back direction and the left-to-right direction.

Figure 13:
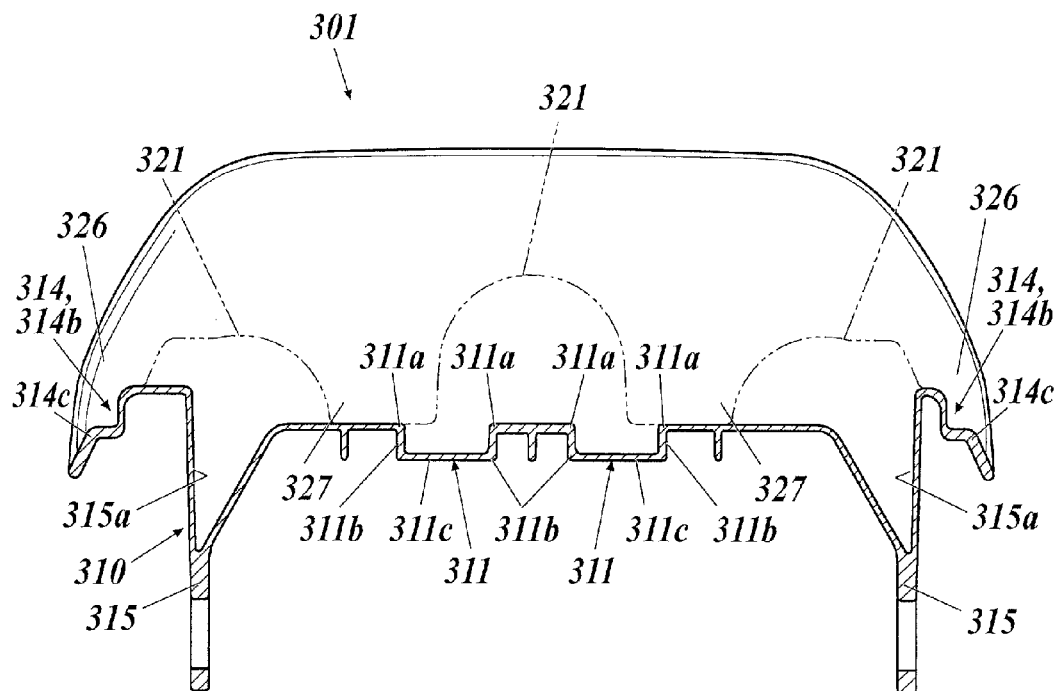
FIG. 13 is a cross-sectional view of the vehicle seat according to the second embodiment.

The reinforcement sections 311 are in a bead shape bulged at the back side of the bottom plate 310 and recessed at the upper side of the bottom plate 310. That is, as shown in FIG. 13, 21, etc., each of the reinforcement sections 311 is formed in a cross-sectional concave shape and includes a pair of side walls 311b, 311b each of which formed by being bent downward from the upper surface of the bottom plate 310 and a bottom which is formed in an integrated fashion being bridged between the lower edges of the side walls 311b, 311b which form a pair. Corners where turned downward from the upper surface of the bottom plate 310 are referred to as turning sections 311a and are the parts having high rigidity in the reinforcement sections 311.

The upper side of the bottom plate 310 includes the upper surface of the bottom plate 310 and the surface of the step section 314b (described later) which is formed along the entire periphery edge of the bottom plate 310 and which is bent toward the vehicle body 302 than the upper surface of the bottom plate 310. On the other hand, the back side of the bottom plate 310 is the back of the upper side of the bottom plate 310 and includes the under surface of the bottom plate 310 and the back side of the step section 314b.

According to the above described reinforcement sections 311, a concavo-convex figure is formed in the bottom plate 310 leading to improvement in rigidity of the bottom plate 310. Further, since the bottom plate 310 can be reinforced in a state where the upper side thereof is partially recessed, bending of the cushion material 320 which is supported by the upper surface of the bottom plate 310 is not inhibited comparing to a case where the bottom plate 310 is reinforced in a state where the upper side thereof is partially bulged. Therefore, a comfortable sitting condition can be provided to a passenger.

Although the reinforcement sections 311 are formed in a cross-sectional concave shape in the embodiment, this is not limitative in any way. The reinforcement sections 311 may be formed in a protruding shape such as a rib on the back side of the bottom plate 310.

Figure 15:
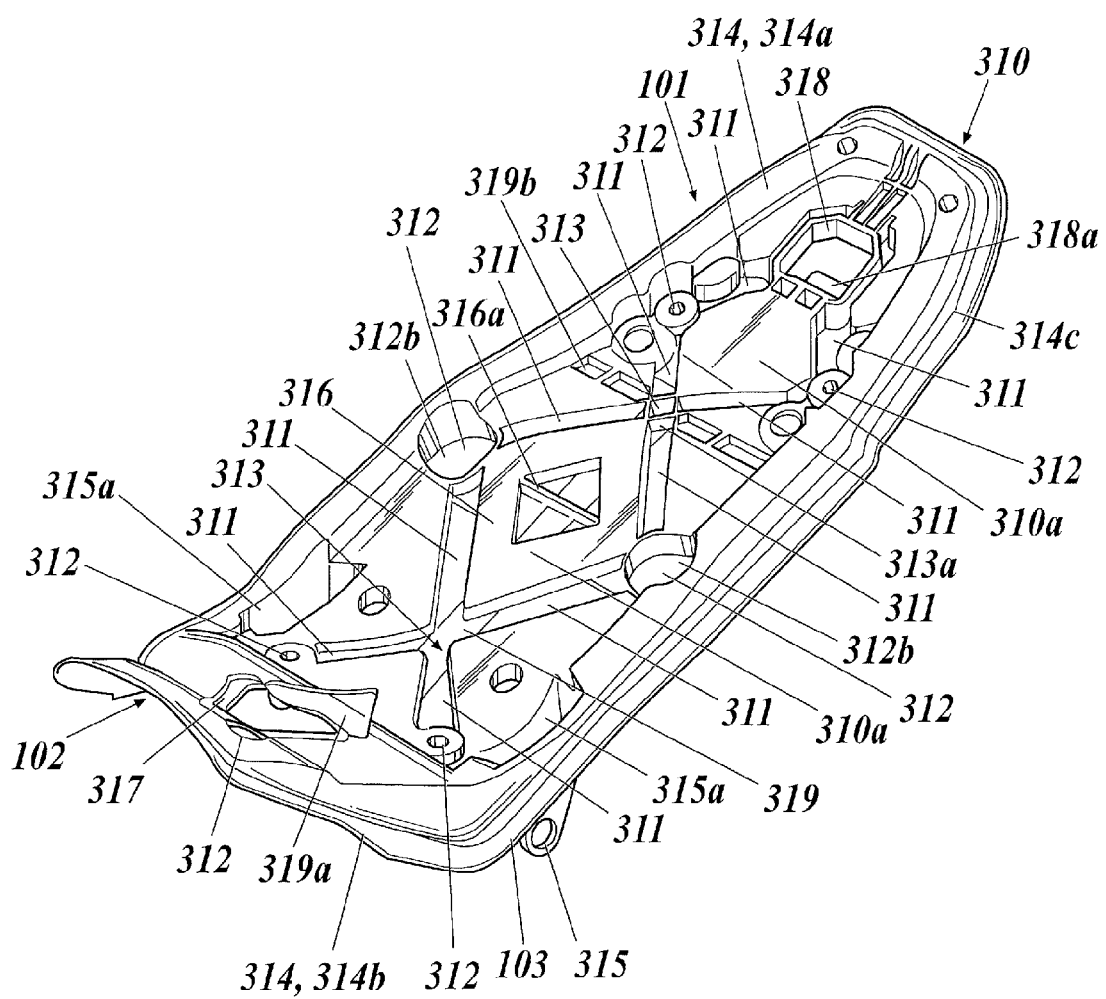
FIG. 15 is a schematic view of a bottom plate according to the second embodiment.
Figure 16:
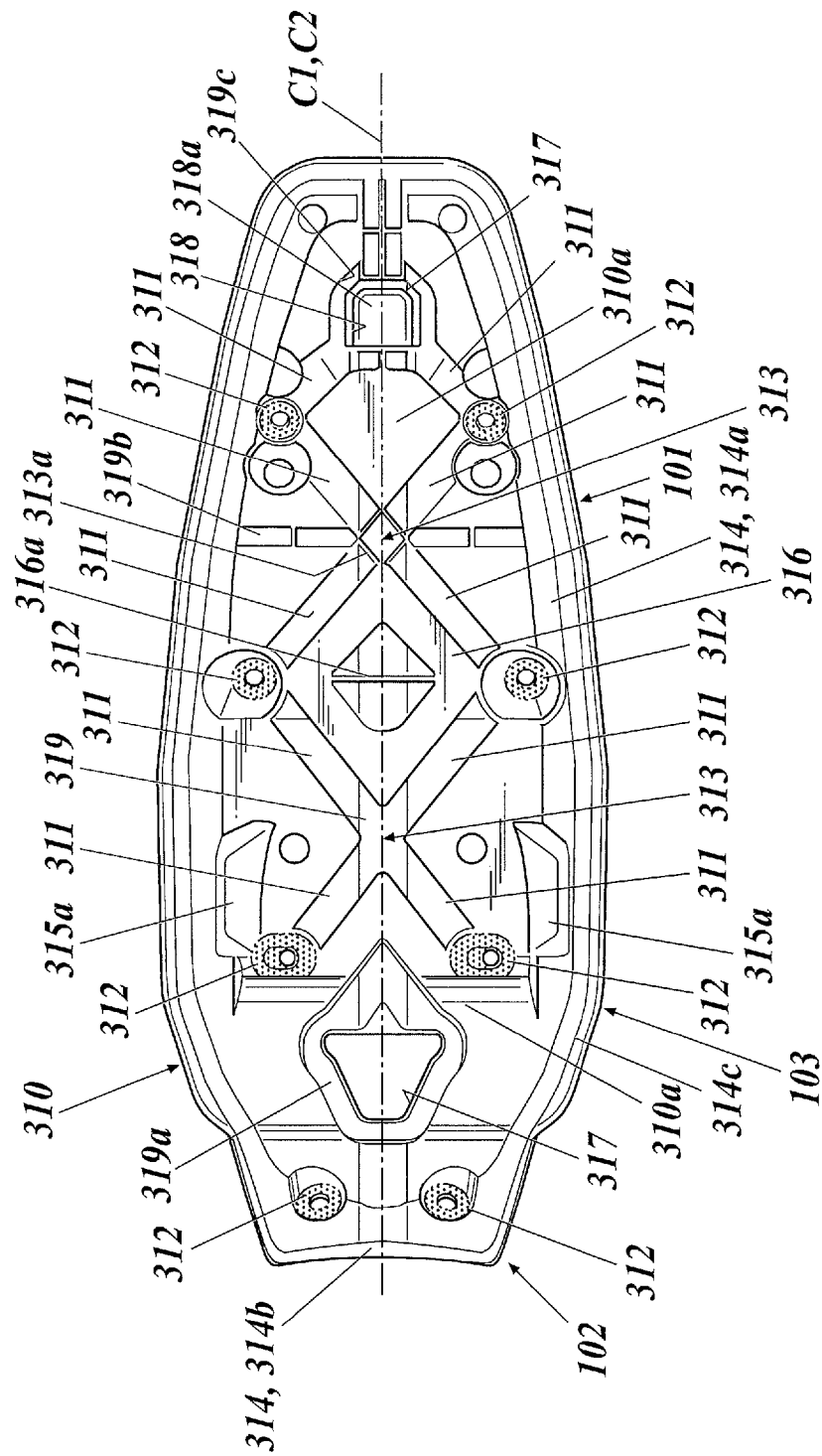
FIG. 16 is a plan view of the bottom plate according to the second embodiment.
Figure 18:
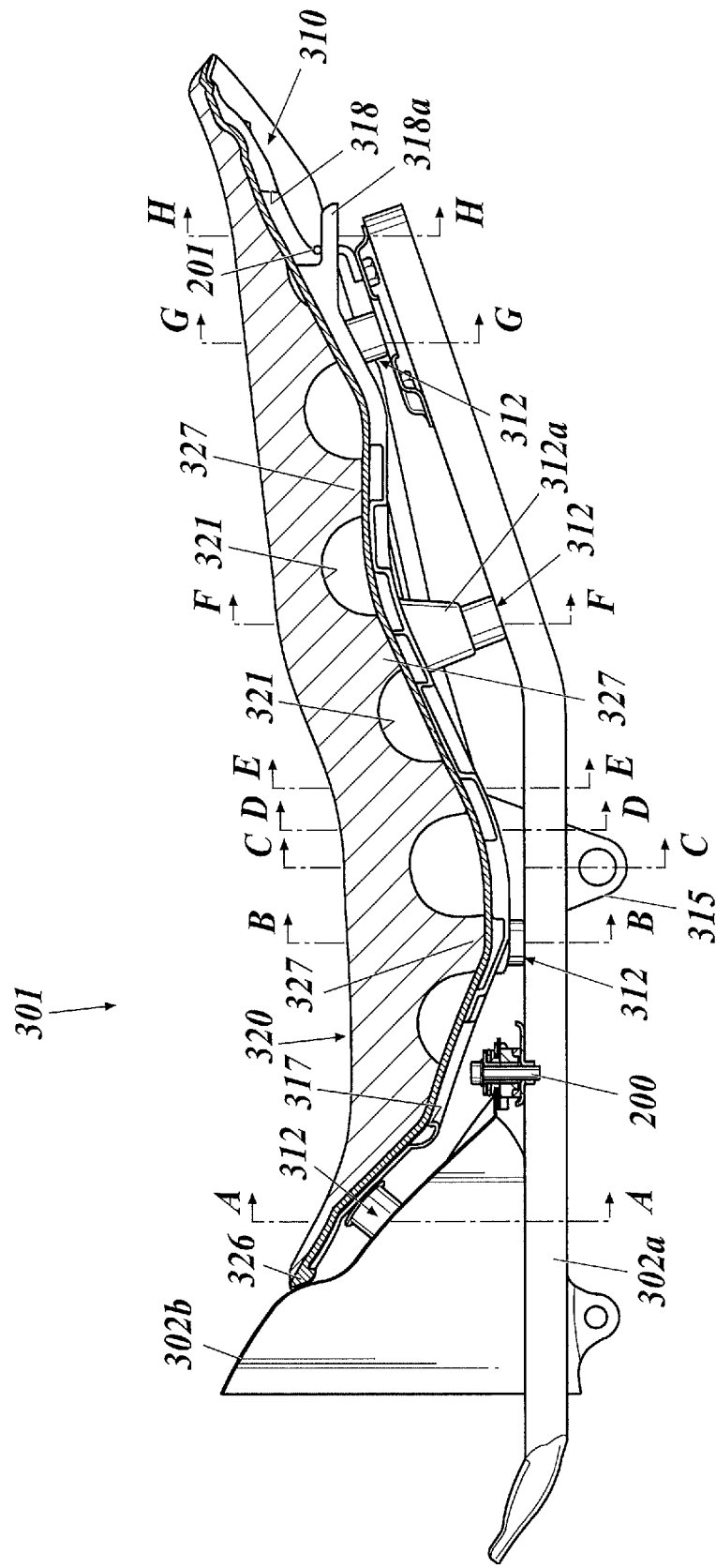
FIG. 18 is a side cross-sectional view of the vehicle seat shown in FIG. 12.

As shown in FIGS. 15, 16 and 18, the bottom plate 310 is provided with a plurality of mounting sections 312 through which the bottom plate 310 is fixed to the vehicle body 302, the mounting sections 312 being formed on the back side of the bottom plate 310 with spaces therebetween.

The mounting sections 312 refer to the parts which are to be fixed to the vehicle body 302 themselves and also to elastic members such as rubbers attached to the above parts and the parts where the elastic members are to be attached.

Further, as shown in FIGS. 19, 20, 24 and 25, the elastic members are provided with projecting inserting sections, and they are fixed to the bottom plate 310 by inserting the inserting sections in the insertion holes formed in the bottom plate 310 to engage the inserting sections and the insertion holes. For example, the elastic members may be fixed to the bottom of the bottom plate 310 by welding or the like.

In each of the elastic members of the mounting sections 312, a bolt hole is formed near the center thereof. The bottom plate 310 can be fixed to the seat rail 302a of the vehicle body 302 by the bolts which are inserted through the bolt holes.

With respect to a part where the distance from the bottom plate 310 to the seat rail 302a is long, a leg section 312a is formed on the back side of the bottom plate 310 in an integrated fashion and an elastic member of the mounting section 312 is fixed at the tip of the leg section 312a. That is, such mounting section 312 includes the leg section 312a.

The leg section 312a is formed so as to be recessed at the upper side of the bottom plate 310. That is, the leg section 312a includes a concave section 312b which is recessed at the upper side of the bottom plate 310.

The plurality of mounting sections 312 of the embodiment are symmetrically arranged at eight points on the back side of the bottom plate 310. Pairs of mounting sections 312 and 312 are arranged in four rows along the front-to-back direction of the bottom plate 310, the mounting sections 312 and 312 forming each pair are arranged widthwise.

Here, among the plurality of mounting sections 312, the mounting sections 312, 312 which are provided at the front end part (in the first row counting from the front) of the bottom plate 310 abuts the fuel tank 302b of the vehicle body 302 as shown in FIG. 18. These mounting sections 312, 312 of the first row are not fixed to the fuel tank 302b by bolts and are not fixed to the seat rail 302a.

The reinforcement sections 311 are arranged between the plurality of mounting sections 312, 312 which are apart from each other. In the embodiment, the bottom plate 310 is provided with a plurality of reinforcement sections 311 as shown in FIGS. 15 and 16. The bottom plate 310 further includes intersections 313 formed by the plurality of reinforcement sections 311 intersecting with each other. That is, the plurality of reinforcement sections 311 are made to intersect with each other and are arranged in different directions. Comparing to a case where the plurality of reinforcement sections do not intersect with each other, in the above arrangement, rigidity of the bottom plate can be improved more.

The plurality of reinforcement sections 311 of the embodiment are symmetrically arranged when being arranged in different directions.

Further, in the embodiment, the bottom plate 310 is provided with a plurality of intersections 313.

On the upper side of one of the plurality of intersections 313 and 313, reinforcement ribs 313a for improving rigidity at the intersection 313 are formed in an integrated manner.

The plurality of intersections 313 and 313 are arranged along the width-wise center C1 of the bottom plate 310, and rigidity at the width-wise center C1 in the bottom plate 310 where load is likely to be applied can be improved.

Further, the plurality of intersections 313 and 313 are arranged avoiding the lowest position 301a in the bottom plate 310. The lowest position 1a in the bottom plate 310 is the maximum load section where a great portion of the load of a passenger is applied. The intersections 313 are the parts in the bottom plate 310 where rigidity is improved. Therefore, the position where the passenger load is applied greatly and the parts where rigidity is improved by the intersections 313 do not overlap. Thereby, the passenger can be prevented from feeling a strong uncomfortable pressure and a comfortable sitting condition can be provided to the passenger.

In the embodiment, as shown in FIG. 16, the front side intersection 313 of the plurality of intersections 313 and 313 is disposed between the mounting sections 312 and 312 of the second row and the mounting sections 312 and 312 of the third row, the rows being counted from the front. On the other hand, the lowest position 1a, which is the maximum load section, is between the mounting sections 312 and 312 of the first row and the mounting sections 312 and 312 of the second row, the row being counted from the front. Thus, the intersection 313 is arranged avoiding the lowest position 301a which is the maximum load section.

The bottom plate 310 includes a pair of projection sections 315 and 315 which project toward the vehicle body 302 and are fixed to the vehicle body 302. The projection section 315 and 315, which form a pair, are arranged near the mounting sections 312, 312 of the second row.

The pair of projection sections 315, 315 are formed so as to be recessed at the upper side of the bottom plate 310. That is, each of the projection sections 315, 315 which form a pair is provided with a concave section 315a which is recessed at the upper side of the bottom plate 310.

The bottom plate 310 is bent from near the mounting sections 312, 312 of the second row. If the part posterior to the mounting sections 312, 312 of the second row is the main surface section 101 and the part anterior to the mounting sections 312, 312 of the second row is the sub surface section 102. The sub surface section 102 which is arranged in front of the main surface section 101 is tilted upward with respect to the main surface section 101. The bent section between the main surface section 101 and the sub surface section 102 is the bent section 103.

Figure 20:
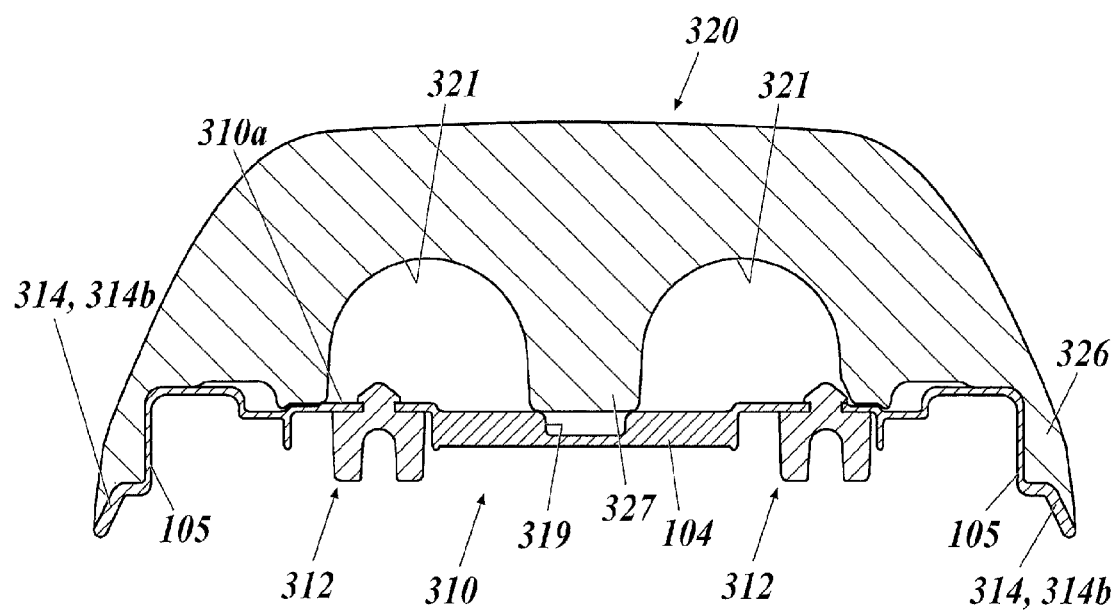
FIG. 20 is a cross-sectional view when cut along the line B-B shown in FIG. 18.
Figure 21:
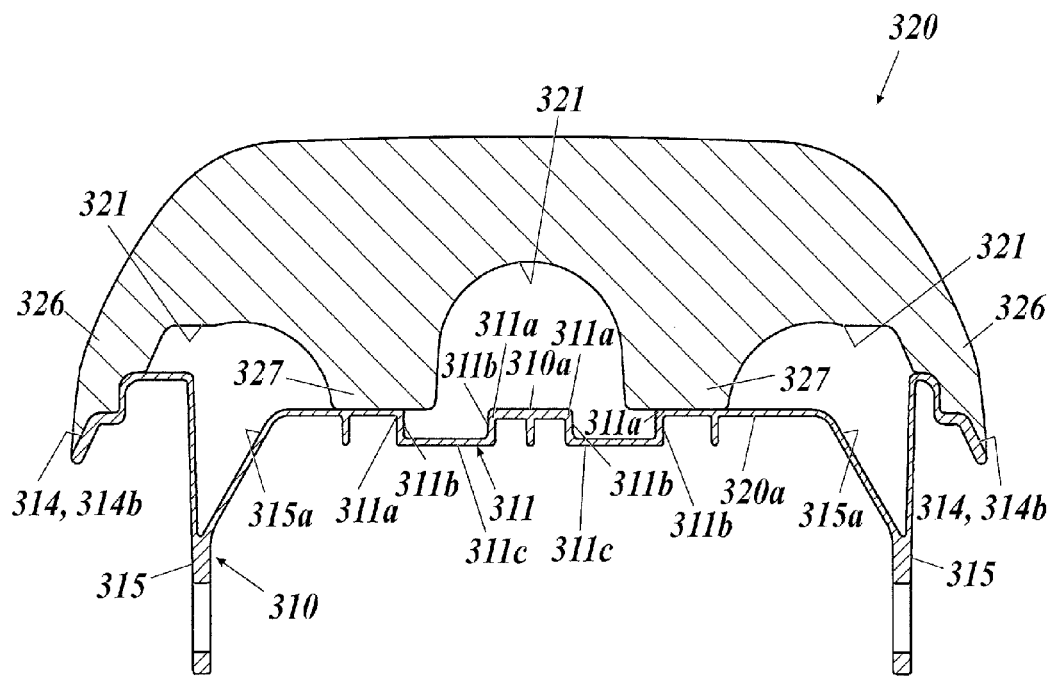
FIG. 21 is a cross-sectional view when cut along the line C-C shown in FIG. 18.
Figure 22:
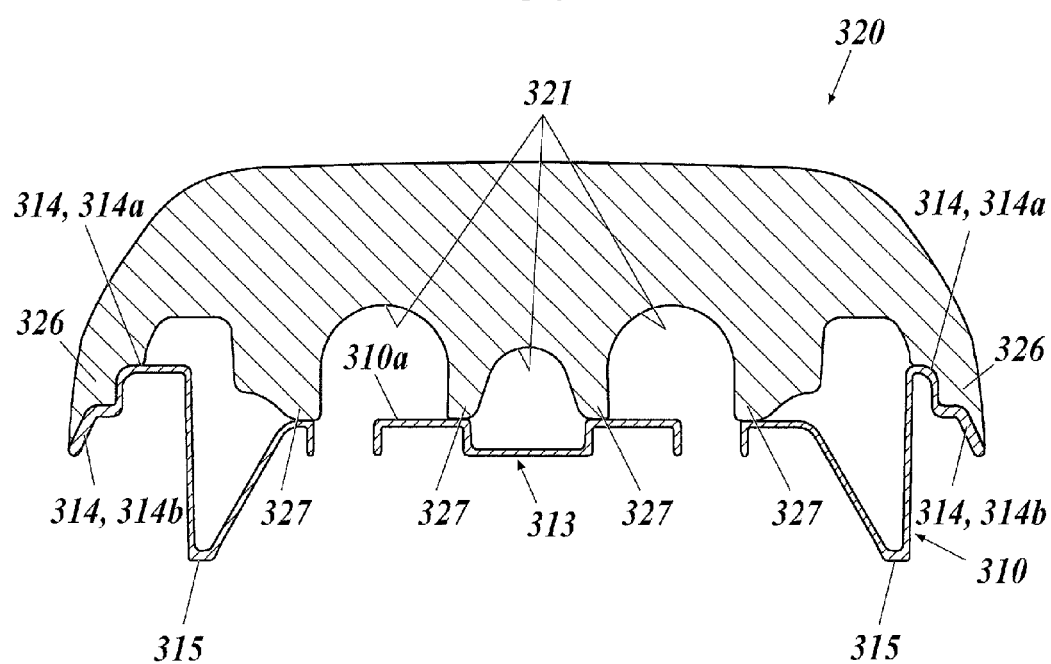
FIG. 22 is a cross-sectional view when cut along the line D-D shown in FIG. 18.
Figure 23:
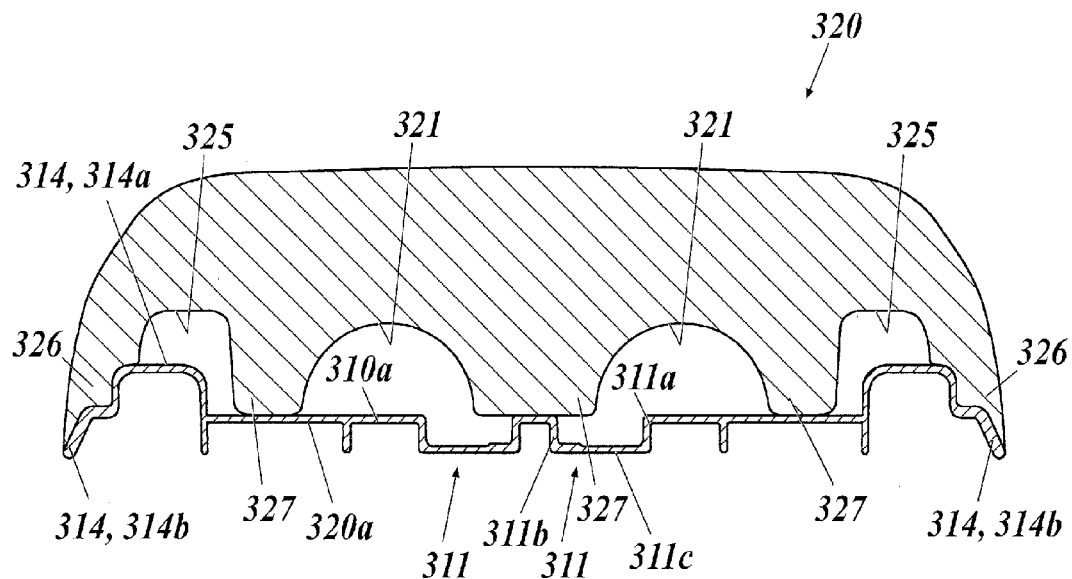
FIG. 23 is a cross-sectional view when cut along the line E-E shown in FIG. 18.

As shown in FIG. 20, a rib 104 which extends in the left-to-right direction is arranged between the mounting sections 312, 312 of the second row at the back side of the bent section 103 in the bottom plate 310.

At near the mounting sections 312, 312 of the second row, the reinforcement sections 311, 311 are arranged and the reinforcement sections 311, 311 form a convex V shape when seen from the above, the lower tip of the V shape pointing backward as shown in FIG. 16. Ends of the reinforcement sections 311, 311, which form a V shape, are arranged near the mounting sections 312, 312 of the second row. In such way, a top view V shaped bead (reinforcement sections 311, 311) arranged between the left and right mounting sections 311, 311 of the second row is formed.

As shown in FIGS. 16 and 20, at the bent section 103 of the bottom plate 310, wall sections 105, 105 which extend vertically are formed so as to face each other in the left-to-right direction, the wall sections being formed along the front-to-back direction. In particular, the wall sections 105, 105 are formed perpendicularly and the lower ends thereof continue to the step section 314b.

At the front and rear parts of the bottom plate 310, openings 317, 318 are respectively formed at the positions facing the vehicle body 302

Figure 31:
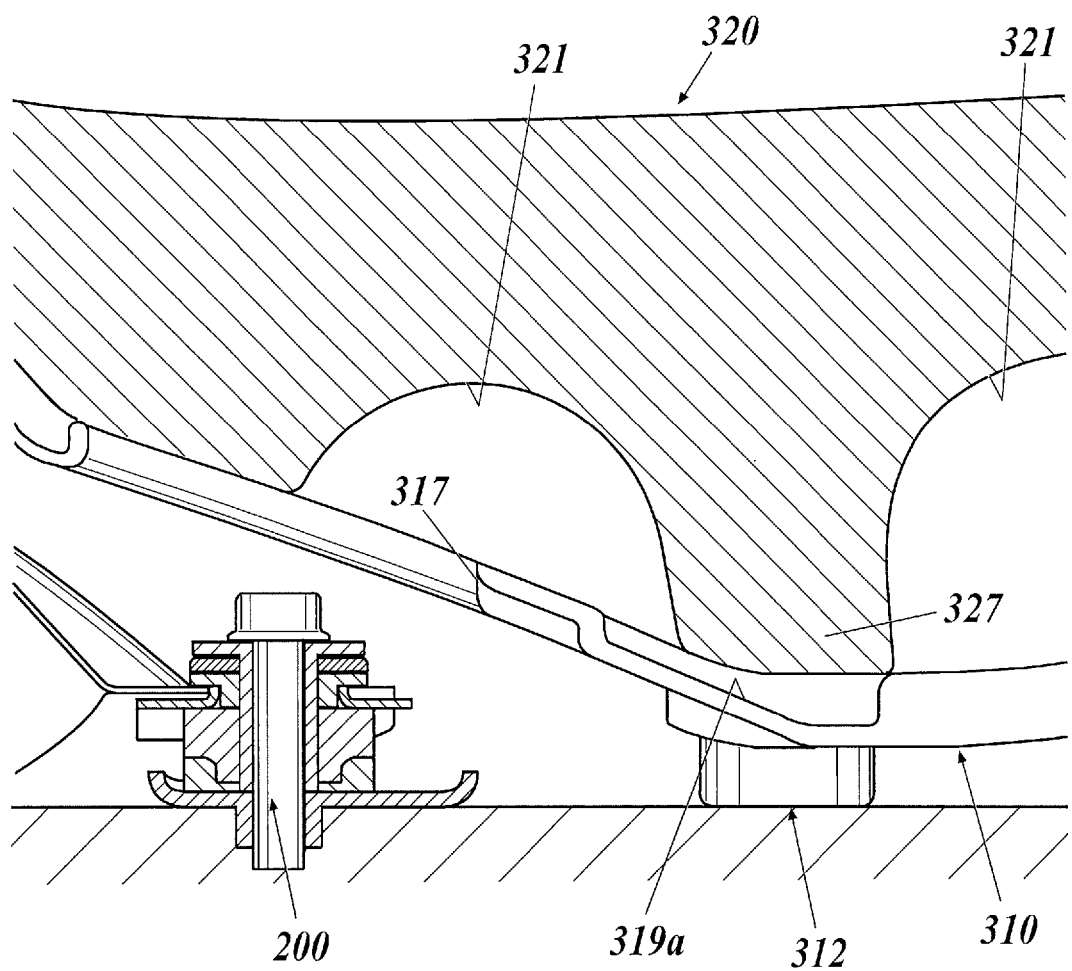
FIG. 31 is a cross-sectional view of an overview structure around an opening near the front part of the bottom plate according to the second embodiment.
Figure 32:
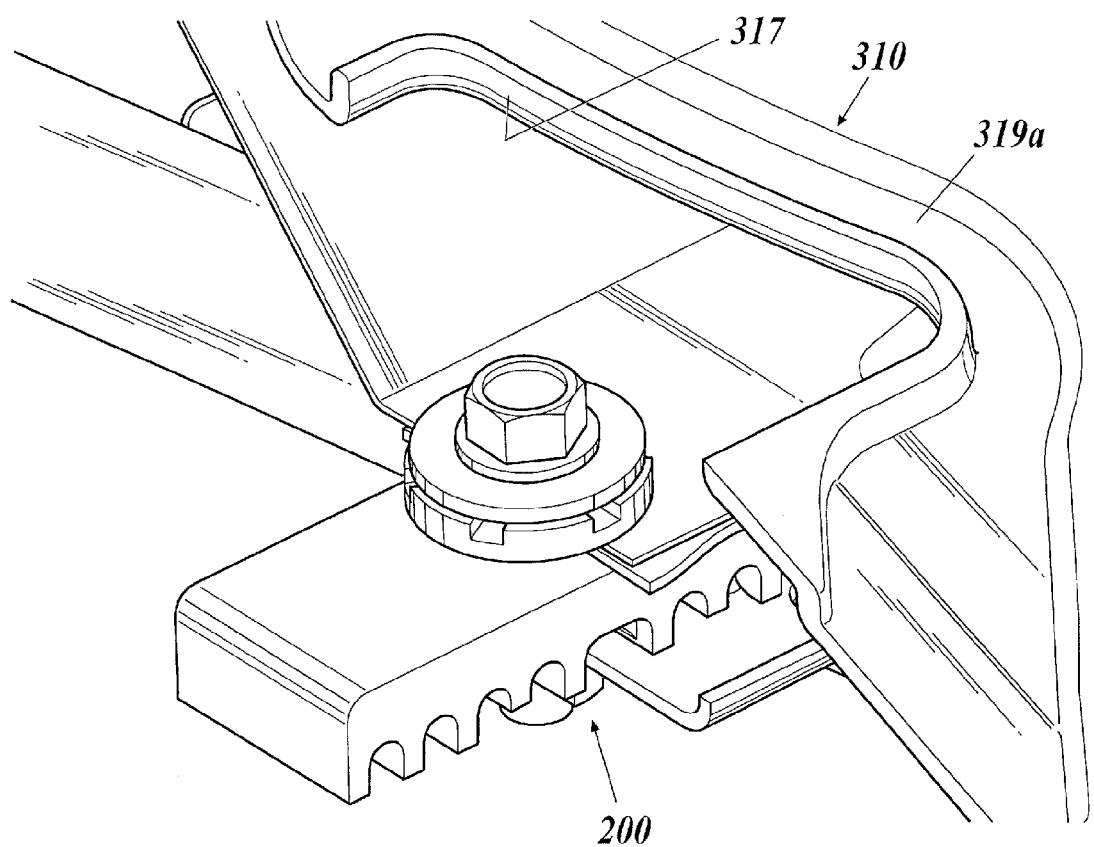
FIG. 32 is a schematic view where a part around the opening near the front part of the bottom plate according to the second embodiment is fractured.

As shown in FIGS. 31 and 32, the opening 317 at the front end part is for preventing the bottom plate 310 from interfering with an lock section 200 of the fuel tank 302b of the vehicle 2. For example, when a person sits on the vehicle seat 301, it is expected that the bottom plate 310 bends with the cushion material 320. The size of the opening 317 is set so that the bottom plate 310 can be prevented from interfering with the lock section 200 of the vehicle body 302 even if the bottom plate 310 bends.

Figure 33:
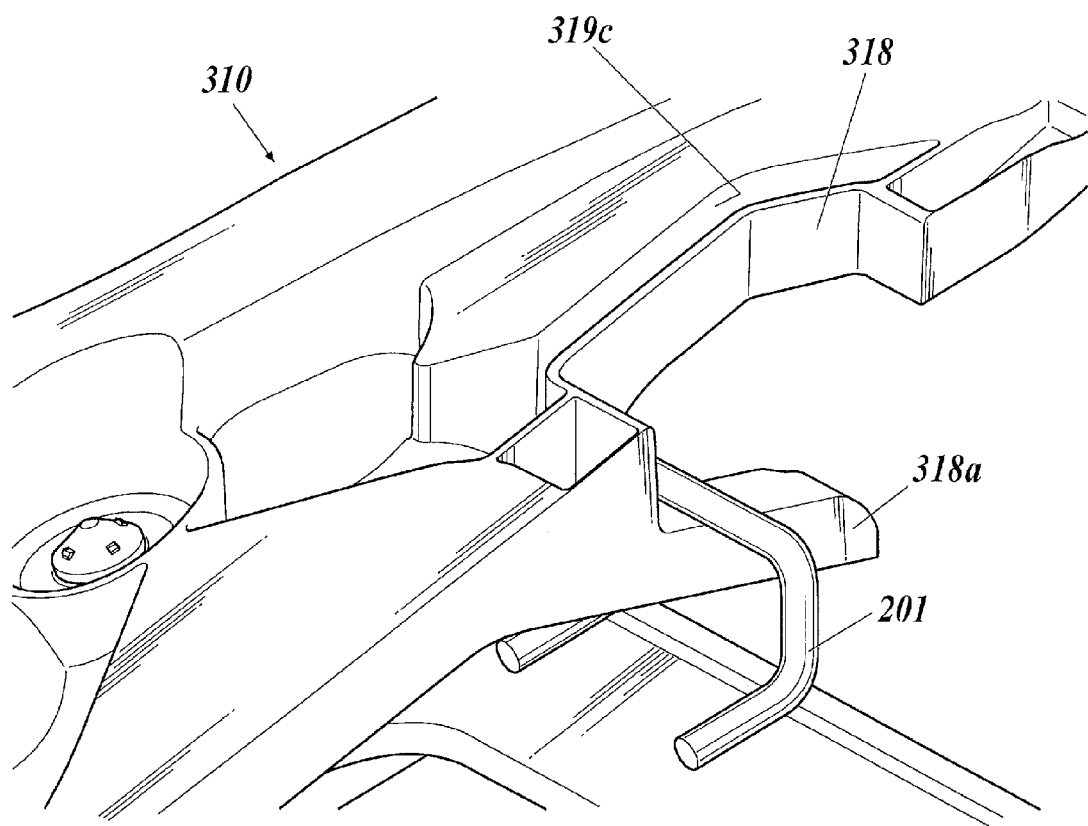
FIG. 33 is a schematic view where apart around an opening near the rear part of the bottom plate according to the second embodiment is fractured.
Figure 34:
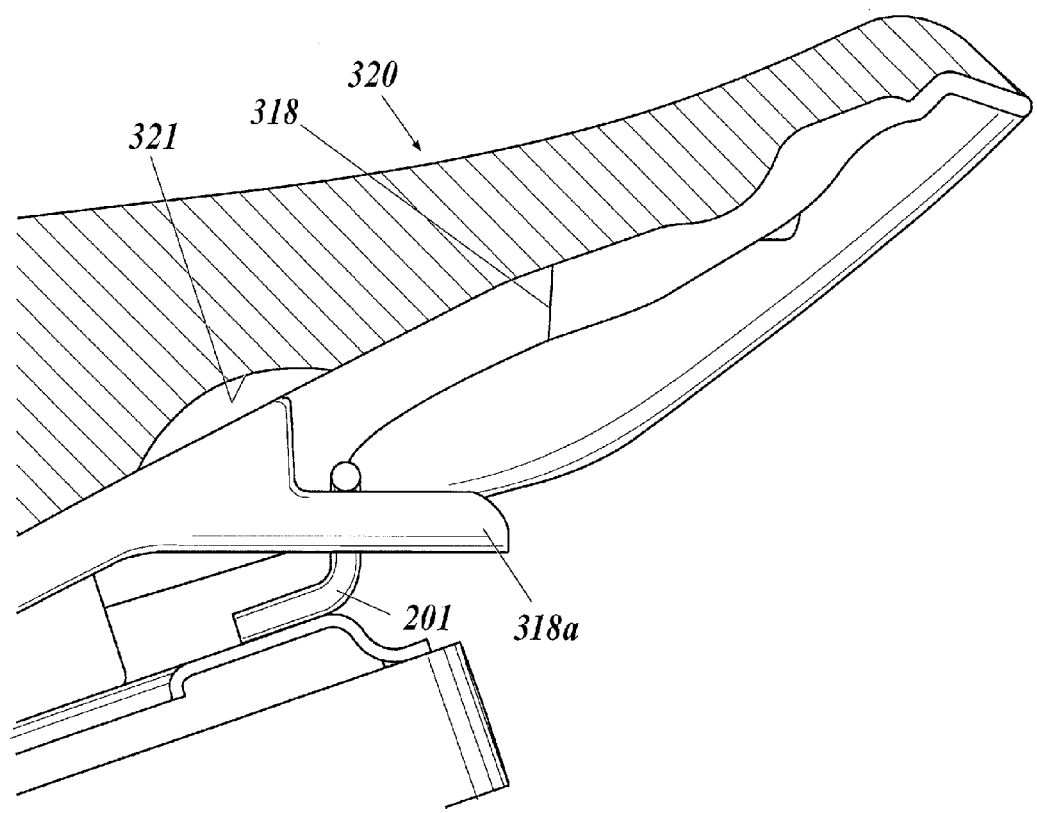
FIG. 34 is a cross-sectional view of an overview structure around the opening near the rear part of the bottom plate according to the second embodiment.

As shown in FIGS. 33 and 34, at the opening 318 at the back end part, an engaging section 318a which engages with the vehicle body 302 is formed. Here, the engaging section 318a is a projection plate which extends backward from the front part of the opening 318. This engaging section 318a is to engage with the to-be-engaged section 201 of the vehicle body 302.

The bottom plate 310 includes a way to improve rigidity of the bottom plate 310 other than the reinforcement sections 311.

As one way, the bottom plate 310 includes a rim reinforcement section 314 that is provided along the periphery edge of the bottom plate 310 as shown in FIGS. 14, 17 to 19. The rim of the bottom plate refers to the entire periphery edge of the bottom plate 310. That is, by such rim reinforcement section 14, rigidity of the entire periphery edge of the bottom plate 310 can be improved.

Further, as shown in FIGS. 13 to 19, the rim reinforcement section 314 includes a main reinforcement section 314a which is provided along the periphery edge of the part corresponding to the position where a passenger sits in the bottom plate 310 and a step section 314b which is provided along the entire periphery edge of the bottom plate 310 including the main reinforcement section 314a. The edge of the surface material 303 is fixed to the step section 314b.

In the bottom plate 310, the part corresponding to the position where a passenger sits is more in the rear than the part where a passenger who drives the automatic two wheeled vehicle sits (the lowest position 301a). That is, since the part anterior to the lowest position 1a is right above the fuel tank 302b, this position is not preferable as a position where a passenger sits.

Therefore, the main reinforcement section 314a is provided posterior to the lowest position 301a in the bottom plate 301 so as to surround the edge of the bottom plate 310. In other words, with the main reinforcement section 314a, rigidity at the rim of the part corresponding to the position where a passenger sits in the bottom plate 310 is improved in particular.

On the other hand, the step section 314b is arranged at the edge that is outside than the main reinforcement section

314a. Thereby, rigidity of the entire rim of the bottom plate 310 including the main reinforcement section 314a can be improved by the step section 314b. Therefore, rigidity of the bottom plate 310 can also be improved. In other words, even if the automatic two wheeled vehicle is pulled up with a finger by the rim of the bottom plate 310 when pulling it up, the bottom plate 310 can be prevented from deforming due to the weight of the automatic two wheeled vehicle.

As shown in FIG. 16, the step section 314b includes a bent section 314c which forms a difference in level of the step section 314b and which is for positioning the fixation points of the edge 303a of the surface material 303. That is, the edge of the bottom plate 310 is formed to have a step section by the material being bent. In the step section 314b which is formed to have a difference in level, the bent section 314c is where an internal angle is formed on the back side of the bottom plate 310. The edge 303a of the surface material 303 is fixed to the bent section 314c by staples 4.

Figure 24:
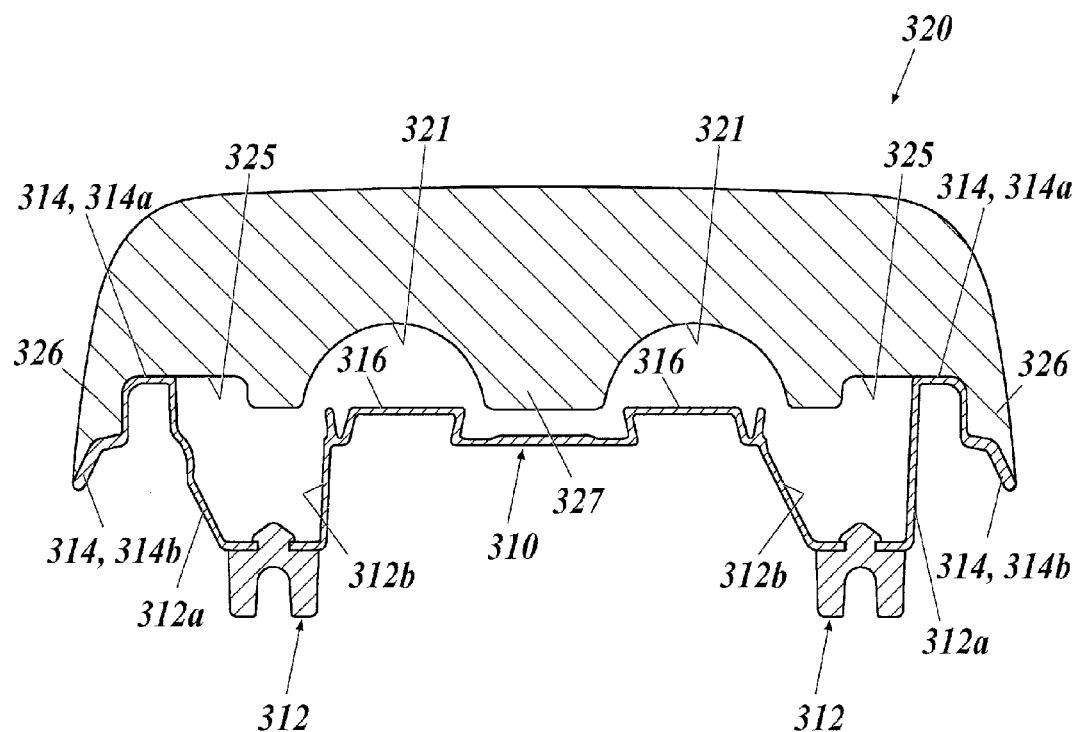
FIG. 24 is a cross-sectional view when cut along the line F-F shown in FIG. 18.
Figure 25:
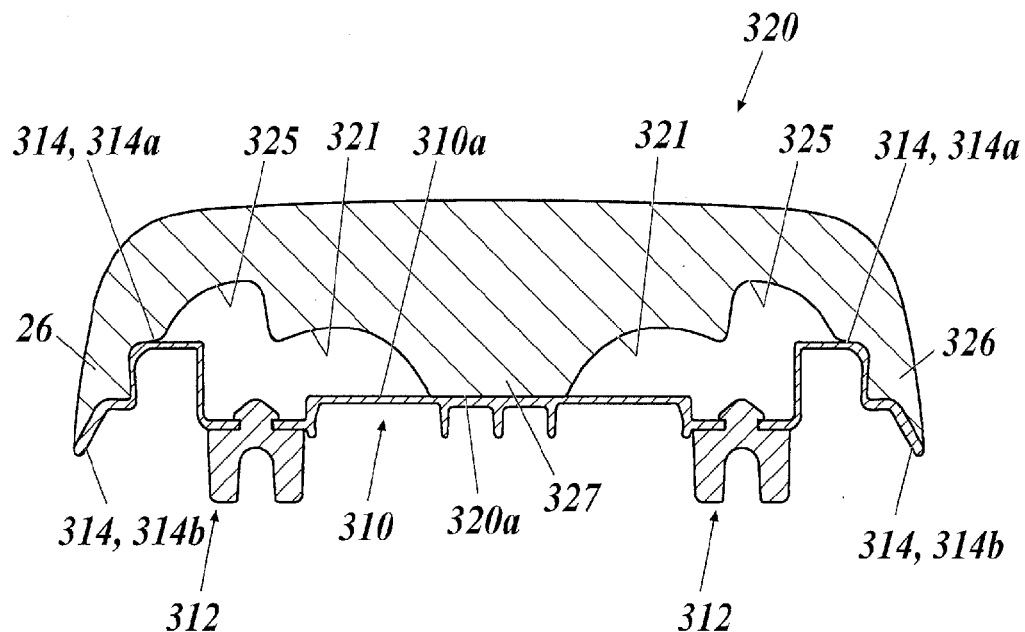
FIG. 25 is a cross-sectional view when cut along the line G-G shown in FIG. 18.
Figure 26:
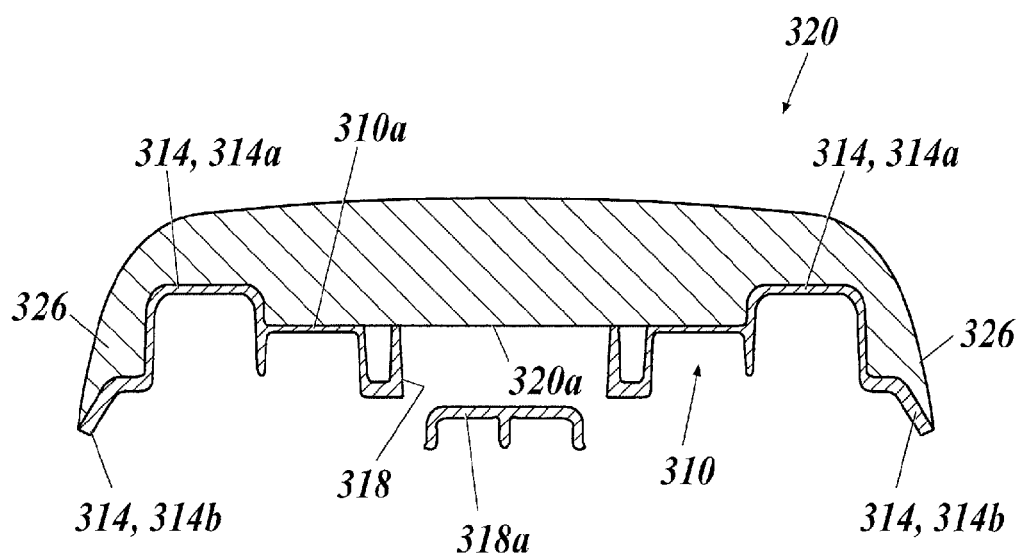
FIG. 26 is a cross-sectional view when cut along the line H-H shown in FIG. 18.

As a way to improve rigidity of the bottom plate 310, the bottom plate 310 includes a reinforcement convex section 316 as shown in FIGS. 15, 16 and 24.

The reinforcement convex section 316 is provided at the center part of the bottom plate 310 where surrounded by the plurality of reinforcement sections 311 which are connected to the mounting sections 312, 312 of the third row. That is, the reinforcement convex section 316 is formed adjacent to the plurality of reinforcement sections 311 as a convex section with respect to the reinforcement sections 311 which are formed to have a cross-sectional concave shape. Here, the reinforcement convex section 316 is formed so as to be recessed at the back side of the bottom plate 310.

On the surface of the diamond shape recessed section at the center of the reinforcement convex section 316, a reinforcement rib 316a for improving rigidity at the diamond shaped recessed section is formed in an integrated fashion.

Figure 17:
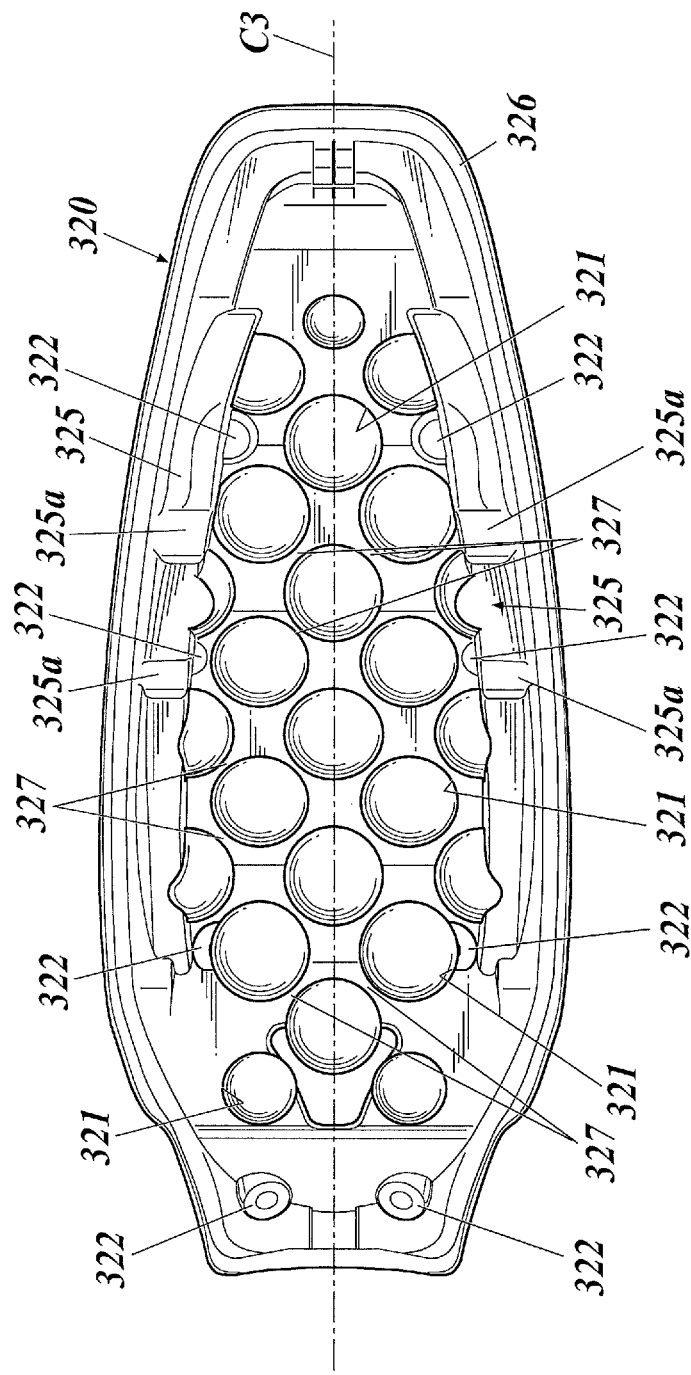
FIG. 17 is a bottom face of a cushion material according to the second embodiment.
Figure 19:
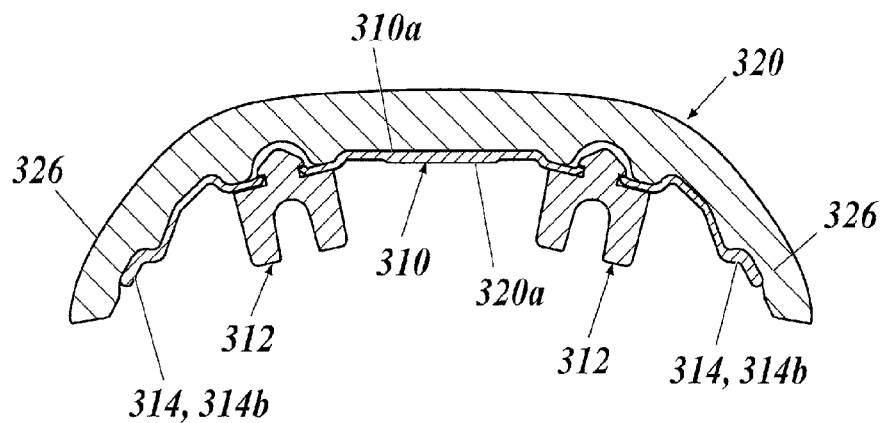
FIG. 19 is a cross-sectional view when cut along the line A-A shown in FIG. 18.

Further, as a way to improve rigidity of the bottom plate 310, the bottom plate 310 includes various types of concave and convex sections as shown in FIGS. 17 to 19.

As such various types of concave and convex sections, a belt-like bead 319 which is a convex section formed intermittently along the width-wise center C2 of the bottom plate 310, a concave section 19a formed around the front side opening 317 of the bottom plate 310, a concave section 319b which intersects the rear side intersection 313 of the bottom plate 310 from left to right, a concave section 319c which is formed around the rear side opening 318 of the bottom plate 310, etc. are suggested, for example. With the concave sections 319a and 319c, the parts around of the openings 317 and 318 are in a bead shape.

The reinforcement sections 311 of the embodiment intersect with the width-wise C1 of the bottom plate 310, and at least a part of each reinforcement section 311 is arranged obliquely with respect to the front-to-back direction of the vehicle seat 301 as an oblique line. However, such configuration is not limitative in any way, and the reinforcement sections 311 may be arranged in the front-to-back direction and in the left-to-right direction of the bottom plate 310, for example.

Next, the cushion material 320 will be described in detail.

As shown in FIG. 13, the cushion material 320 includes concave sections 321 as spaces. Since a porous material such as urethane foam as described above is used for the cushion material 320, the cushion material 320 includes countless small pores which are generated due to foaming in the manufacturing process. The concave sections 321 are different from the countless small pores. They are not in micro sizes and they are formed intentionally in the cushion material 320.

The concave sections 321 are formed at the back side of the cushion material 320 and are opened toward the bottom plate 310.

The cushion material 320 is provided with a plurality of concave sections 321. By the concave sections 321 being formed in the cushion material 320, the cushion material 320 can easily bend toward the bottom plate 310 when a passenger sits on the vehicle seat 301. The parts between the individual concave sections 321 that are not recessed are wall sections 327.

Each concave section 321 is formed in a shape that the size gradually becomes smaller as approaching the upper side from the lower side. In particular, inside of each concave section 321 is a concave curved surface which is recessed upward from the reference surface 320a of the cushion material 320. In such way, the concave sections 321 are in a dome shape. Since all of the plurality of concave sections 321 are formed in such way, the cushion material 320 can bend easily when a load is applied near the concave sections 321. Further, there is an advantage that the cushion material 320 can be taken out easily from a mold which is in a contrasting shape of the concave sections 321 when forming the cushion material 320.

The shape of the openings at the lower ends of the concave sections 321 is a circle shape as shown in FIG. 17. Here, the shape of the openings of the concave sections 321 is not limited to a circle shape and may be an oval shape.

The plurality of concave section 321 are arranged along the front-to-back direction of the cushion material 320 on the width-wise center C3 of the cushion material 320.

That is, the width-wise center C3 of the cushion material 320 is the part where the load of a passenger is likely to be applied. Such width-wise center C3 of the cushion material 320 where the load is likely to be applied can be made to bend easily in the front-to-back direction of the cushion material 320 by the plurality of concave sections 321 which are arranged in a line.

As described above, since the plurality of mounting sections 312 which are to be fixed to the vehicle body 302 are provided along the inner periphery on the back side of the bottom plate 310 with spaces therebetween, rigidity of the bottom plate 310 itself can be improved. A plurality of other concave sections 321 are formed in the cushion material 320 at between the section corresponding to the positions of the plurality of mounting sections 312 and the plurality of concave sections 321 arranged along the width-wise center C3 of the cushion material 320. That is, the plurality of concave sections 321 can be formed in the cushion material 321 within the range corresponding to where rigidity of the bottom plate is increased by the plurality of mounting sections 312. Therefore, while stably supporting the cushion material 320 by the bottom plate 310, bending of the cushion material 320 can be improved even more.

In FIG. 17, a plurality of mounting section corresponding parts 322 are shown as the parts corresponding to the plurality of mounting sections 312 in the cushion material 320.

As described above, the upper surface of the bottom plate 310 and the under surface of the cushion material 320 are the reference surfaces 310a and 320a, respectively. Since the plurality of concave sections 321 are formed on the under surface of the cushion material 320, the surface excluding the plurality of concave sections 321 is the reference surface 320a. Therefore, even if the plurality of concave sections 321 are formed at the back side of the cushion material 320, the bottom plate 310 can easily support the cushion material 320.

Figure 27:
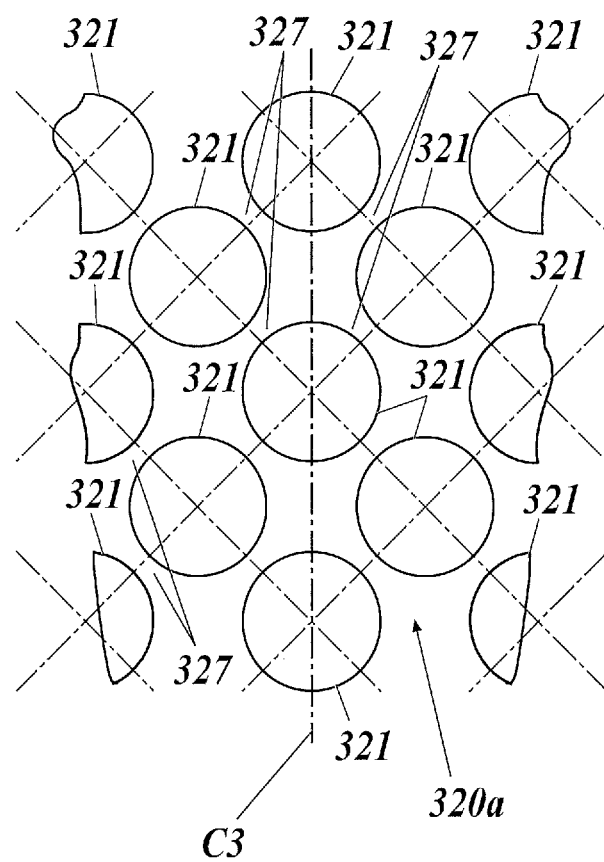
FIG. 27 is a diagram for explaining an arrangement of concave sections in the cushion material according to the second embodiment.

As shown in FIGS. 17 and 27, the plurality of concave sections 321 are arranged in a grid pattern via the wall sections 327. Further, the plurality of concave sections 321 arranged in a grid pattern are arranged in diagonal directions with respect to the front-to-back direction of the cushion material 320.

In such way, since the plurality of concave sections 321 are arranged in a grid pattern, the plurality of concave sections 321 can be lined neatly and efficiently within the back side range of the cushion material 320 and a great number of concave sections 321 can be formed. Moreover, even if the plurality of concave sections 321 which are arranged in a grid pattern are arranged in diagonal directions with respect to the front-to-back direction of the cushion material 320, the plurality of concave sections 321 can be lined neatly and efficiently within the back side range of the cushion material 320. Therefore, a great number of concave sections 321 can be formed.

Since the concave sections 321 are arranged in diagonal directions, with respect to two rows of the plurality of concave sections 321 wherein the concave sections are adjacent to each other in their front and back, the positions of the plurality of concave sections 321 in one row and the positions of the plurality of concave sections 321 in the other row can be shifted in the left and right. In other words, the plurality of concave sections 321 can be arranged in a zigzag pattern. Thereby, for example, the bending degree of the cushion material 320 can be improved by making the size of the plurality of concave sections 321 be larger. Further, even more concave sections 321 can be arranged densely by making the plurality of concave sections 321 be closer to each other.

Figure 28:
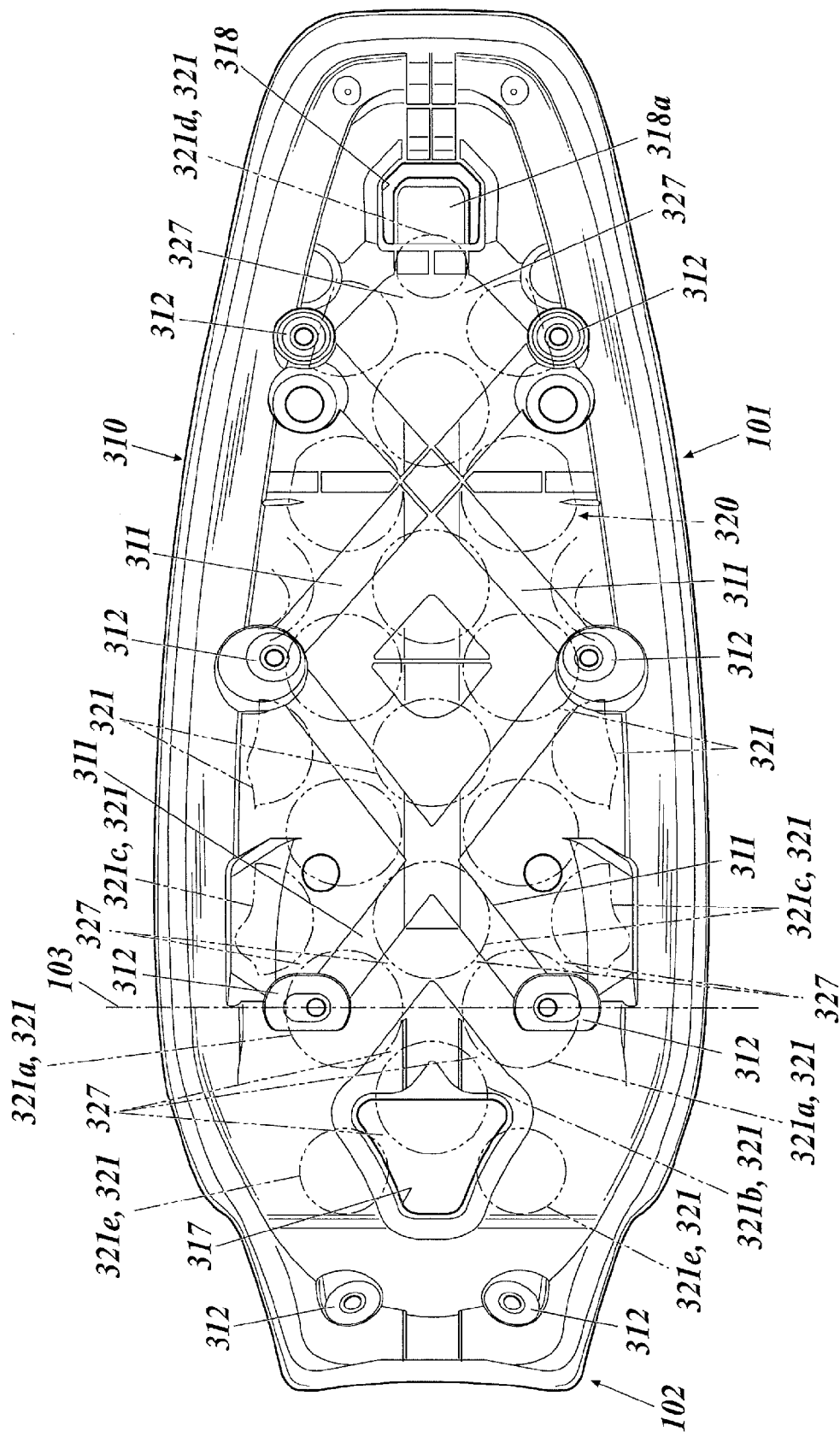
FIG. 28 is a diagram for explaining a positional relation between individual parts of the bottom plate and the concave sections according to the second embodiment.

As shown in FIG. 28, concave sections 321a are provided at the part corresponding to the bent section 103 of the bottom plate 310. In FIG. 28, the bent section 103 is shown in a two-dot chain line for convenience sake. However, the bent section 103 has a region of a certain extent. Although a case where two concave sections 321a are provided at the part corresponding to the bent section 103 is described in the present invention, it is sufficient that at least one concave section 321a is provided at the section. Further, it is preferred that the deepest point of the concave curved surface of each concave section 321, i.e. the inner apex thereof, is to be arranged on the bent section 103. The two concave sections 321a which are provided at the part corresponding to the bent section 103 overlap with the two ends of the top view V shaped bead (reinforcement sections 311, 311).

The ischium of a passenger is likely to be positioned on the bent section 103. Therefore, the two concave sections 321a provided at the part corresponding to the bent section 103 face the ischium of the passenger.

Further, concave sections 321b and 321c are provided in the front and rear of the concave sections 321a provided at the part corresponding to the bent section 103 with wall section 327 therebetween. One front side concave section 321b is arranged in the front of and between the two concave sections 321a. Three rear side concave sections 321c are arranged behind and between the two concave sections 321a.

The concave section 321b and the concave section 321d are provided at the parts corresponding to the openings 317 and 318 of the bottom plate 310, respectively. In particular, the concave section 321b is provided at the part corresponding to the front side opening 317 of the bottom plate 310. Approximately front half of the concave section 321b overlaps with the opening 317. The concave sections 321e and 321c are provided in the front of and behind the concave section 321b with wall sections 327 therebetween. The periphery of the opening 317 faces the wall sections 327.

On the other hand, the concave section 321d is provided at the part corresponding to the rear side opening 318 of the bottom plate 310. The back part of the concave section 321d overlaps with the opening 318.

Next, operation of the embodiment will be described.

Figure 29:
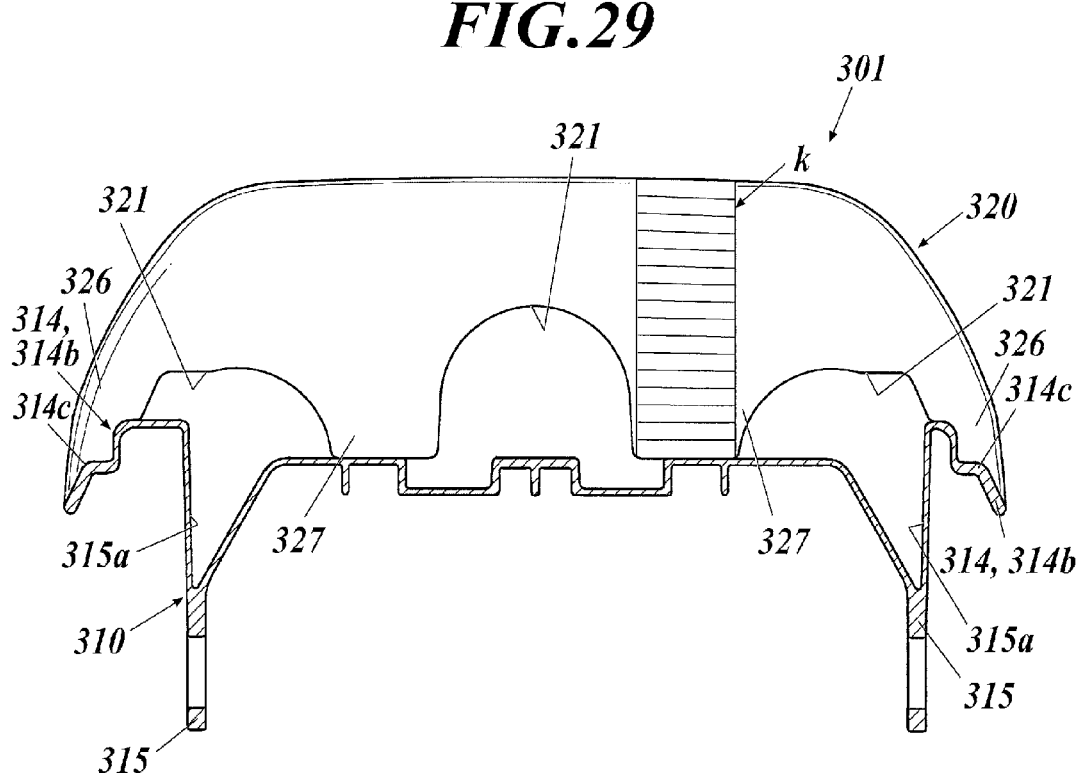
FIG. 29 is a diagram for explaining a state where the cushion material is not bent according to the second embodiment.

In FIG. 29, the grid section K shows the deformation level of individual layers in the cushion material 320. As shown in FIG. 29, the cushion material 320 is not bent before a passenger sits thereon, and the layers in the grid section K maintain the normal state where the individual layers are in the same size.

Figure 30:
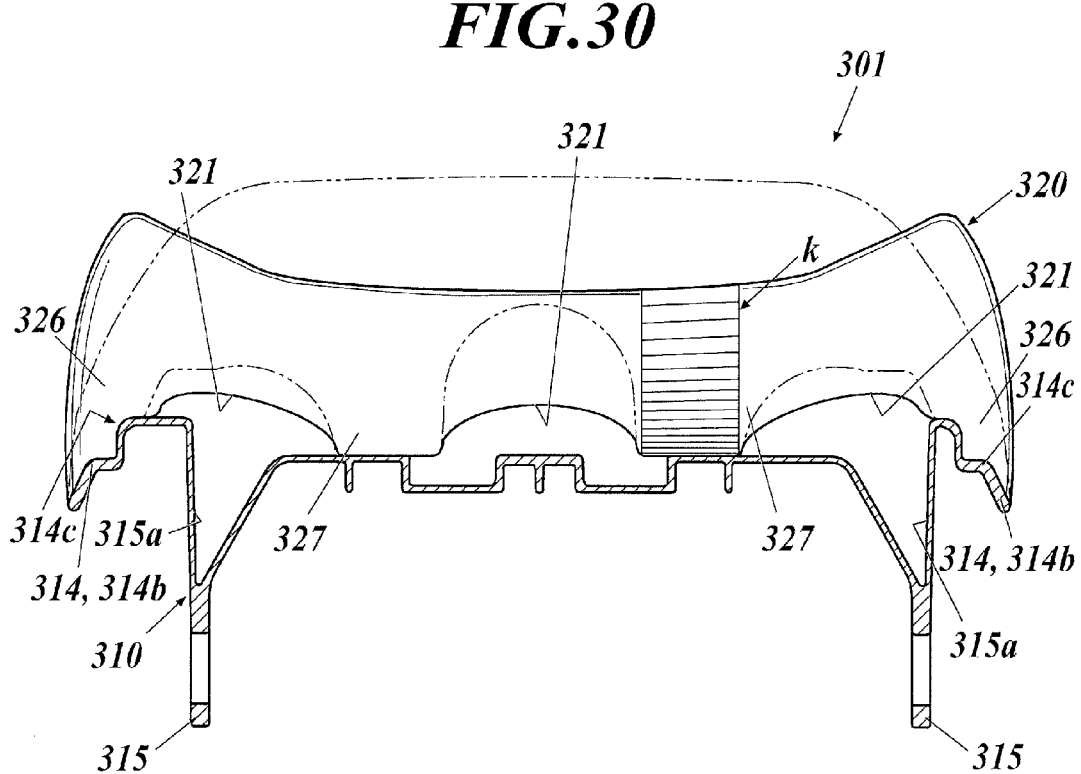
FIG. 30 is a diagram for explaining a state where the cushion material is bent according to the second embodiment.

In FIG. 30, the two-dot chain line shows the cushion material 320 before a passenger sits thereon. When the cushion material 320 bends due to a passenger sitting thereon as shown in FIG. 30, as shown in the grid section K, the degree of bending becomes smaller as moving up to the upper layers from the lowest layer. Since stress concentrates at the wall sections 327 whose cross-section areas are small, the degree of bending is greater in the lowest layer comparing to the upper layers.

It has been said that, in general, a passenger can sit comfortably when he/she can feel the hardness to a certain extent in a vehicle seat of a two wheeled vehicle or the like. Therefore, if the cushion material 320 is formed so as to bend at a part other than the upper layers thereof, the cushion material 320 is not likely to bend in the upper layers thereof and the passenger can feel a certain level of hardness. On the other hand, a part other than the upper layers of the cushion material 320 is more likely to bend comparing to the upper layers, this part can absorb the vibration and the like caused by the unevenness of the road surface. Therefore, even if the cushion material 320 is made thinner and the vehicle seat is made lighter, a stable sitting can be maintained.

Since the cushion material 320 is formed so that it bends at the lowest layer part thereof, the bending is to start at the lowest layer part that is most distanced from the upper layer part. Therefore, the upper layer part can be inhibited from deforming with the bending of the lowest layer part, and the comfortable sitting can be prevented from becoming uncomfortable due to bending.

Since the plurality of concave sections (space sections) 321, each of which has a shape that becomes smaller as approaching upper section thereof from the lower section thereof, are formed in the cushion material 320, the lowest layer part of the cushion material 320 being the lower ends of the concave sections 321, the cross-section area of the lowest layer part is smaller than the cross-section area of the upper layer part. Thereby, stress is concentrated at the lowest layer part, and thus, the lowest layer part is even more likely to bend.

Since the cushion material 320 has hollow spaces therein by forming the concave sections 321, the cushion material 320 can be made lighter.

Moreover, since the lower ends of the concave sections 321 are opened, they can deform in their circumferential direction with increased degree of freedom and the lowest layer part can bend even more.

Since the shape of the opening sections of the concave sections 321 is a circle shape or an oval shape, stress can be dispersed more comparing to a case where corners are formed at the rims of the opening sections, and thus, breaking can be prevented.

Since the inner surfaces of the concave sections 321 are concave curved surfaces which are recessed upward, stress can be dispersed due to the inner surfaces of the concave sections 321 being curved surfaces, and thus, breaking can be prevented.

The bent section 103 between the main surface section 101 and the sub surface section 102 of the bottom plate 310 is where the buttocks of a passenger are to be placed in most cases. That is, the passenger can sit more comfortably if the cushioning properties at this section are improved. Further, if at least one concave section 321a is formed at the bent section 103 in the cushion material 320 as described above, the cushioning properties can be ensured by the concave section 321a even if the cushion material 320 is made thin, and thus, a stable sitting can be maintained.

Since the concave section 321a is formed at the part corresponding to the ischium of the passenger who sits on the bent section 103, the cushioning properties with respect to the ischium of the passenger can be ensured, and thus, the passenger can sit more comfortably.

Since the space sections 321b and 321c are also provided in the front and rear of the concave section 321a at the part corresponding to the bent section 103, even higher cushioning properties can be ensured. Further, since the wall sections 327 are provided between the concave sections 321a, 321b and 321c, the wall sections 237 regulates excess bending of the cushion material 320, and thus, a stable cushioning properties can be ensured.

Since the inner surface of the concave section 321a at the part corresponding to the bent section 103 is a concave curved surface that is recessed upward and the deepest point of the concave curved surface is arranged on the bent section 103, stress due to a passenger sitting on the bent section 103 can be dispersed effectively.

Since the wall sections 105, 105 that extend vertically are formed along the front-to-back direction so as to face each other at the left side and the right side of the bottom plate 310 on the bent section 103, rigidity at the bent section 103 in the front-to-back direction can be improved by the wall sections 105, 105. If rigidity in the front-to-back direction of the bent section 103 is improved, twisting of the bottom plate 310 can be prevented, and thus, more comfortable sitting can be provided.

Since the rib 104 that extends from the left to right is provided on the back side between the left and right mounting sections 312, 312 of the second row and the top view V shape bead (reinforcement sections 311, 311) is arranged on the upper side, rigidity of the left and right mounting sections 312, 312 can be improved, and thus, stability in attachment to the vehicle body can be improved.

Since the top view V shaped bead (reinforcement sections 311, 311) is arranged so as to overlap with the concave sections 321a at the part corresponding to the bent section 103 of the cushion material 320, the bead guides the entering and exiting of the air in the concave sections 321 caused by the bending of the cushion material 320, and thus, the cushion material 320 can bend smoothly.

The parts near the openings 317 and 318 in the bottom plate 310 are the parts not directly relevant to supporting of the vehicle seat 301. Therefore, as described above, even if the concave sections 321b and 321d are formed at the positions facing the openings 317 and 318 in the cushion material 320, stability of the vehicle seat 301 is maintained, and thus, a stable sitting can also be maintained.

Since the concave sections 321e and 321a are also provided in the front and rear of the concave section 321b which is at the position facing the opening 317, the plurality of concave sections 321a, 321b and 321e can be arranged near the opening 317 which is not directly relevant to supporting the vehicle seat 1, and thus, the cushion material 320 can be made even more lighter.

Since the wall sections 327 between the plurality of concave sections 321 face the periphery of the opening 317, the periphery of the opening 317 is to be supported by the wall sections 327, and thus, stability of the periphery of the opening 317 can be ensured.

Since the periphery of the opening 317 and the periphery of the opening 318 in the bottom plate 310 are formed in a bead shape by the concave sections 319a and 319c, rigidity at the periphery of the opening 317 and the periphery of the opening 318 can be improved, and thus, stability at the periphery of the opening 317 and the periphery of the opening 318 can be ensured.

At a predetermined section of the cushion material 320, it is assumed that the reference surface 320a of the cushion material 320 is arranged at the position vertically facing the reinforcement sections 311 of the bottom plate 310.

Thereby, when the cushion material 320 bends, the reference surface 320a can be made to sink more downward by using the difference in level formed by the reinforcement sections 311, i.e. the turning sections 311a and the wall sections 311b of the reinforcement sections 311. Therefore, the cushion material 320 can bend easily.

That is, not only the reference surface 310a of the bottom plate 310 and the reference surface 320a of the cushion material 320 are tightly in contact with each other, the reference surface 320a partially sinks toward the recesses of the cross-section concaved reinforcement sections 311. Therefore, the cushion material 320 can be prevented from being difficult to bend.

With respect to the bottom plate 310 and the cushion material 320, even if the bottom plate 310 is provided with the plurality of reinforcement sections 311 and also even if the cushion material 320 is provided with the plurality of concave sections 321, basically, the reference surfaces 310a and 320a are in contact with each other. Therefore, the degree of bending of the cushion material 320 is uniform overall.

As shown in FIGS. 17, 22 to 25, the cushion material 320 includes edge concave sections 325, 325 which are arranged near the two side edges of the cushion material 320, respectively, and which are to be arranged above the main reinforcement section 314a of the bottom plate 310. Spaces are formed between these edge concave sections 325, 325 and the main reinforcement section 314a.

Each of the edge concave sections 325, 325 includes ribs 325a which are formed at a plurality of points along the front-to-back direction of the vehicle seat 301.

With such edge concave sections 325, 325, the cushion material 320 can be made lighter. When the vehicle seat 301 is to be used as a two-seater, the parts corresponding to the edge concave sections 325, 325 are likely to bend. Therefore, sitting properties thereof, including a case where the vehicle seat 301 is used as a two-seater, can be improved.

With respect to the plurality of ribs 325a, the under surfaces thereof are in contact with the upper surface of the main reinforcement section 314a. Therefore, the load of a passenger who sits behind the passenger who drives the automatic two wheeled vehicle can be supported easily.

Further, as shown in FIGS. 15 to 26, the cushion material 320 includes an abutting step section 326 which is provided around the entire periphery edge of the cushion material 320 and which abuts the upper side of the step section 314b of the bottom plate 310. That is, the abutting step section 326 is formed so as to correspond to the shape of the upper side of the step section 314b and is tightly in contact with the step section 314b.

By the step section 314b and the abutting step section 326 being in contact with each other, the entire periphery edge of the bottom plate 310 and the entire periphery edge of the cushion material 320 are in a unified state. Therefore, when folding the edge 303a of the surface material 303 in to the back side of the bottom plate 310 and fixating the edge 303a thereto, the surface material 303 can easily cover the edge of the bottom plate 310 and the edge of the cushion material 320.

Since a porous material such as urethane foam is used for the cushion material 320 as described above, the air goes through, enters and exits, the micro pores of the cushion material 320 when the cushion material bends and recovers from the bent state. Further, as described above, the reference surface 310a of the bottom plate 310 where the plurality of reinforcement sections 311 are formed and the reference surface 320a of the cushion material 320 wherein the plurality of concave sections 321 are formed are in contact with each other.

Therefore, one concave section 321 of the plurality of concave sections 321 and another concave section 321 which is different from the one concave section 321 are in communication with each other through the reinforcement section 311 formed so as to be recessed at the upper side of the bottom plate 310. Thereby, when the cushion material 320 bends, the air can be let out to another concave section 321 from the one concave section 321 through the reinforcement sections 311. Therefore, the cushion material 320 can bend more easily.

Since the cushion material 320 is supported by the upper surface of the bottom plate 310 and is covered with the surface material 303, there may be a case where the air flow is blocked. In order to control this, the opening 317 is formed in the bottom plate 310 as an air passage.

According to the embodiment, since the cushion material 320 is provided with the concave sections 321, the cushion material 320 can be made lighter even without making the cushion material 320 be thinner as in a conventional case. Thereby, while maintaining a stable sitting, the vehicle seat 301 can be made lighter. Further, since a plurality of concave sections 321 are formed in the cushion material 320, the cushion material 320 can bend more easily.

In the embodiment, an example of a case where a plurality of concave sections 321 are formed on the underside of the cushion material 320 in order to make the cushion material 320 bend at the part other than its upper layer part is described above. However, as long as the cushion material 320 bends at a part other than its upper layer part, a cushion material of a form other than the above described form can be applied.

For example, a cushion material made of a soft foam material such as urethane foam, polypropylene foam, polyethylene foam, etc. has a tendency to bend at the high density part, in general. Therefore, if the density at the lowest layer part of the cushion material is made to be the densest, the cushion material can be formed so as to bend at the lowest layer part even if the concave sections 321 are not formed. That is, a cushion material that bends at the lowest layer part can be realized without considering its shape and the like.

With respect to the cushion material 320 having the concave sections 321, if the density as the lowest layer part is made to be the densest, the cushion material 320 is more likely to bend at the lowest layer part thereof and the cushioning properties can be improved.

In the above embodiment, an example of a case where the space sections of the present invention are the concave sections 321 opened at the lower parts thereof is described. However, the space sections themselves may be closed. For example, when forming a cushion material with a soft foam material, closed space sections may be formed by forcing the air to be injected before the soft foam material becomes solidified.

Figure 35:
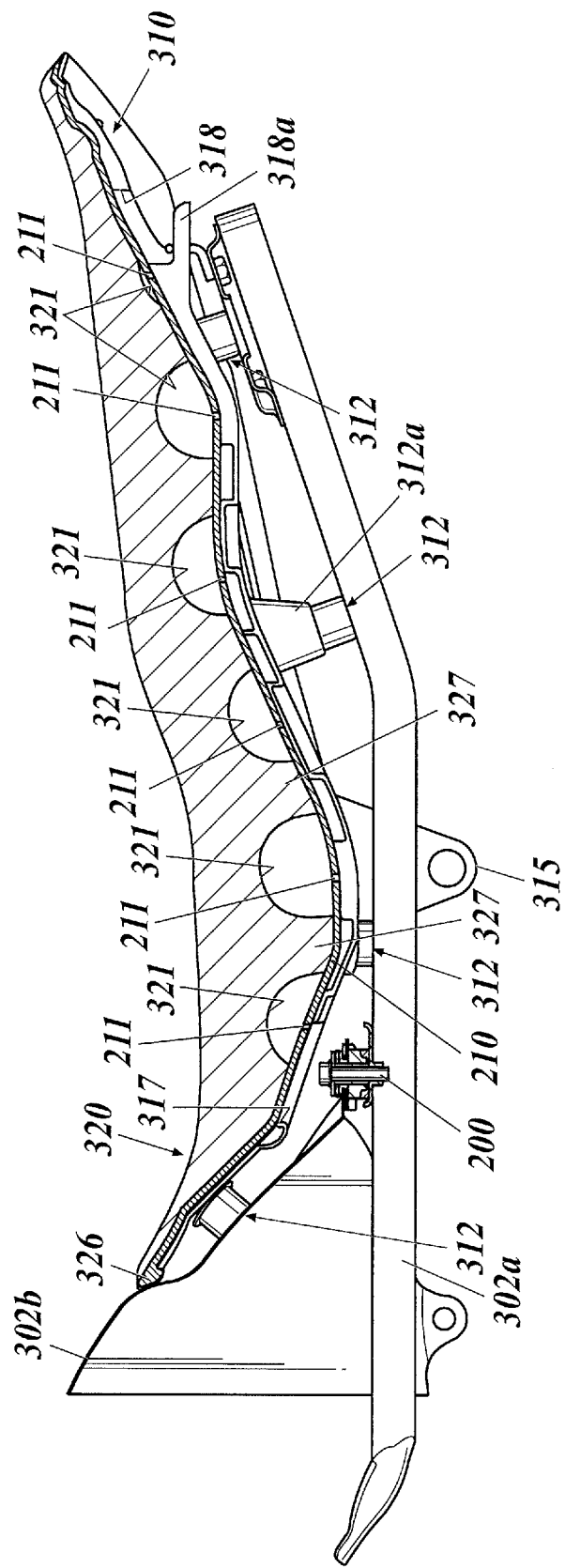
FIG. 35 is a side cross-sectional view of a modification example of the cushion material.

As shown in FIG. 35, the lower ends of the concave sections 321 may be closed by attaching a laminate member 210 across the entire under surface of the cushion material 320. The laminate member 210 is a plate-like member of resin, and air holes 211 to ensure air passage from inside the concave sections 321 are formed at the parts corresponding to the concave sections 321.

Since the laminate member 210 is layered across the entire under surface of the cushion material 320, the lower parts of the concave sections 321 are closed. Therefore, the air inside the concave sections 321 can be maintained and a stable cushioning properties can be ensured.

Further, since the air holes 211 which ensures air passage from the concave sections 321 are formed in the laminate member 210, small amount of air enters to and exits from the concave sections 321 through the air holes 211 according to bending of the cushion material 320. If the concave sections 321 are completely closed, there is a possibility that bending of the cushion material 320 is inhibited due to the air in the concave sections 321. However, if small amount of air enters to and exits from the concave sections 321 through the air holes 211, the cushion material 320 can bend smoothly while stable cushioning properties are ensured.

INDUSTRIAL APPLICABILITY

The bottom plate structure of the vehicle seat according to the embodiment can be used in a vehicle seat which is to be mounted on a two wheeled vehicle or the like, for example.

DESCRIPTION OF SYMBOLS 1 vehicle seat
1a lowest position
2 vehicle body
2a seat rail
2b fuel tank
3 surface material
3a edge
4 staple
10 bottom plate
11 reinforcement section
11a turning section
11b wall section
11c bottom
12 mounting section
12a leg section
13 intersection
13a reinforcement rib
14 rim reinforcement section
14a main reinforcement section
14b step section
14c bent section
18 engaging section 18a claw section
20 cushion material
21 concave section

The invention claimed is:

1. A bottom plate structure of a vehicle seat, comprising:
a bottom plate which is to be provided on a vehicle body;
a reinforcement section provided in the bottom plate, wherein:
the reinforcement section is provided with a plurality of oblique grooves which intersects with a width-wise center of the bottom plate, the plurality of oblique grooves being arranged obliquely with respect to a front-to-back direction of the vehicle seat and being recessed at an upper side of the bottom plate, and the reinforcement section includes an intersection where the plurality of oblique grooves intersect with each other such that the reinforcement section is configured to be substantially X shaped, and
the reinforcement section is formed so as to be recessed at the upper side of the bottom plate and is separated from another recessed portion in the upper side of the bottom plate by a longitudinal end of each of the plurality of oblique grooves, and
a cushion material that is supported on the upper side of the bottom plate, wherein a surface material covers the bottom plate and the cushion material.

2. The bottom plate structure of the vehicle seat according to claim 1, wherein:
the bottom plate further includes a plurality of mounting sections which are provided on a back side of the bottom plate with spaces along the front-to-back direction therebetween and which are to be fixed to the vehicle body, and
positions of four ends of the substantially X shaped reinforcement section respectively correspond to positions of the plurality of mounting sections which are apart from each other along the front-to-back direction.

3. The bottom plate structure of the vehicle seat according to claim 1, wherein the reinforcement section is arranged between the plurality of mounting sections so as to connect the plurality of mounting sections.

4. The bottom plate structure of the vehicle seat according to claim 1, wherein a part in the cushion material where a passenger sits is between a plurality of mounting sections.

5. The bottom plate structure of the vehicle seat according to claim 1, wherein
a concave section is formed on an upper side of the bottom plate, and
a concave section is formed in the cushion material so as to face the concave section of the bottom plate.

6. The bottom plate structure of the vehicle seat according to claim 1, wherein a plurality of the X shaped reinforcement sections are provided next to each other along the front-back-direction on the upper side of the bottom plate.

7. The bottom plate structure of the vehicle seat according to claim 6, wherein two opposing substantially triangular concave sections are formed in an approximate diamond shape between the X shaped reinforcement sections arranged next to each other along the front-to-back direction.

8. The bottom plate structure of the vehicle seat according to claim 1, wherein the intersection is arranged on the width-wise center of the bottom plate.

9. The bottom plate structure of the vehicle seat according to claim 1, wherein the intersection is arranged so as not to overlap with a lowest position along a width-wise center of the vehicle seat in the front-to-back direction of the vehicle seat.

10. The bottom plate structure of the vehicle seat according to claim 1, wherein the intersection is arranged at a lowest position along a width-wise center of the vehicle seat in the front-to-back direction of the vehicle seat.

11. The bottom plate structure of the vehicle seat according to claim 1, wherein
the bottom plate further includes a rim reinforcement section provided along a periphery edge of the bottom plate, and
the reinforcement section and the rim reinforcement section are connected.

12. The bottom plate structure of the vehicle seat according to claim 11, wherein
the vehicle body on which the bottom plate is to be provided has a fuel tank,
a mounting section which is provided at a front end part of the bottom plate among a plurality of mounting sections abuts the fuel tank of the vehicle body, and
the periphery edge of the bottom plate where the rim reinforcement section is provided includes a front end rim of the bottom plate which is anterior to the mounting section which abuts the fuel tank.

13. The bottom plate structure of the vehicle seat according to claim 11, wherein
the rim reinforcement section includes:
a main reinforcement section which is provided along a periphery edge of a part in the bottom plate corresponding to a position where a passenger sits; and
a step section which is provided along an entire periphery edge of the bottom plate including the main reinforcement section, an edge of the surface material being fixed to the step section, and
the step section includes a bent section which forms a difference in level and which is for positioning points to fixate the edge of the surface material.

14. The bottom plate structure of the vehicle seat according to claim 1, wherein the bottom plate further includes a plurality of mounting sections, the plurality of mounting sections include a plurality of outer mounting sections which are provided along a periphery edge of the bottom plate and a central mounting section which is provided on the width-wise center of the bottom plate, the central mounting section being disposed more inside than the plurality of outer mounting sections, and
a plurality of reinforcement sections are provided and are arranged between the plurality of outer mounting sections and the central mounting section.

15. The bottom plate structure of the vehicle seat according to claim 1, wherein
the bottom plate further includes an engaging section which engages with the vehicle body, and
the reinforcement section and the engaging section are connected.

16. The bottom plate structure of the vehicle seat according to claim 1, wherein the cushion material has a smaller cross-section at a lower layer part and is formed so as to bend at a part other than an upper layer part.

17. The bottom plate structure of the vehicle seat according to claim 16, wherein the cushion material is formed so as to bend at a lowest layer part.

18. The bottom plate structure of the vehicle seat according to claim 17 wherein the cushion material is densest at the lowest layer part.

* * * * *